United States Patent
Ishizu et al.

(10) Patent No.: US 9,809,682 B2
(45) Date of Patent: Nov. 7, 2017

(54) HYDROPHOBIZED SPHERICAL POLYALKYLSILSESQUIOXANE FINE PARTICLE, EXTERNAL ADDITIVE FOR TONER, DRY TONER FOR ELECTROPHOTOGRAPHY, AND METHOD OF MANUFACTURING HYDROPHOBIZED SPHERICAL POLYALKYLSILSESQUIOXANE FINE PARTICLE

(71) Applicant: TOKUYAMA CORPORATION, Shunan-shi, Yamaguchi (JP)

(72) Inventors: Kenichi Ishizu, Shunan (JP); Yohei Chikashige, Shunan (JP); Tadaharu Komatsubara, Shunan (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 0 days.

(21) Appl. No.: 15/109,275

(22) PCT Filed: Jan. 7, 2015

(86) PCT No.: PCT/JP2015/050297
§ 371 (c)(1),
(2) Date: Jun. 30, 2016

(87) PCT Pub. No.: WO2015/107961
PCT Pub. Date: Jul. 23, 2015

(65) Prior Publication Data
US 2016/0319077 A1    Nov. 3, 2016

(30) Foreign Application Priority Data
Jan. 14, 2014 (JP) .................. 2014-004411

(51) Int. Cl.
C08G 77/04       (2006.01)
G03G 9/097       (2006.01)

(52) U.S. Cl.
CPC ....... C08G 77/045 (2013.01); G03G 9/09708 (2013.01); G03G 9/09725 (2013.01); G03G 9/09775 (2013.01)

(58) Field of Classification Search
CPC .. C07F 7/1836; C08K 5/5419; G03G 9/09775
See application file for complete search history.

(56) References Cited

U.S. PATENT DOCUMENTS

| 4,871,616 A | 10/1989 | Kimura et al. |
| 4,895,914 A * | 1/1990 | Saitoh ............ C08K 9/06 427/212 |
| 5,106,922 A | 4/1992 | Saito et al. |

FOREIGN PATENT DOCUMENTS

| DE | 3905785 A1 | 8/1989 |
| EP | 0326810 A2 | 8/1989 |
| EP | 0373941 A2 | 6/1990 |
| JP | 63101854 A | 5/1988 |
| JP | 63295637 A | 12/1988 |
| JP | H01185367 A | 7/1989 |
| JP | 01217039 A | 8/1989 |
| JP | 01242625 A | 9/1989 |
| JP | H0618879 B2 | 3/1994 |
| JP | H11116681 A | 4/1999 |

OTHER PUBLICATIONS

International Search Report corresponding to Application No. PCT/JP2015/050297; dated Feb. 10, 2015.

Extended European Search Report corresponding to Application No. 15737055.2-1377/3095805 PCT/JP2015050297; dated Jul. 6, 2017.

* cited by examiner

*Primary Examiner* — Kuo-Liang Peng
(74) *Attorney, Agent, or Firm* — Cantor Colburn LLP

(57) ABSTRACT

Provided are a poly alkylsilsesquioxane fine particle having hydrophobicity and having a small particle diameter, an external additive for toner and a dry toner for electrophotography each using the same, and a method of manufacturing a hydrophobized spherical polyalkylsilsesquioxane fine particle. The hydrophobized spherical poly alkylsilsesquioxane fine particle has a mass-based median diameter in a centrifugal sedimentation method within the range of from 0.05 µm to 0.3 µm. The fine particle is produced through, for example, at least a process involving: mixing a raw material solution prepared using an alkyl trialkoxysilane with an alkaline aqueous medium to obtain a polycondensation reaction liquid; mixing the polycondensation reaction liquid with an aqueous solution to obtain a fine particle dispersion liquid; and blending a hydrophobizing agent in the fine particle dispersion liquid.

17 Claims, 1 Drawing Sheet

HYDROPHOBIZED SPHERICAL POLYALKYLSILSESQUIOXANE FINE PARTICLE, EXTERNAL ADDITIVE FOR TONER, DRY TONER FOR ELECTROPHOTOGRAPHY, AND METHOD OF MANUFACTURING HYDROPHOBIZED SPHERICAL POLYALKYLSILSESQUIOXANE FINE PARTICLE

CROSS REFERENCE TO RELATED APPLICATIONS

This is the U.S. national stage of application No. PCT/JP2015/050297, filed on Jan. 7, 2015. Priority under 35 U.S.C. §119(a) and 35 U.S.C. §365(b) is claimed from Japanese Application No. 2014-004411, filed Jan. 14, 2014, the disclosure of which is also incorporated herein by reference.

TECHNICAL FIELD

The present invention relates to a hydrophobized spherical polyalkylsilsesquioxane fine particle, an external additive for toner, a dry toner for electrophotography, and a method of manufacturing a hydrophobized spherical polyalkylsilsesquioxane fine particle.

BACKGROUND ART

In general, silica is excellent in mechanical strength, has high chemical stability, and is easily available with various shapes, average particle diameters, and particle size distributions. In addition, when a surface of silica is subjected to hydrophobizing treatment, its affinity for a resin can be enhanced to improve dispersibility in the resin and fluidity of the resin. Accordingly, silica is used in various applications, such as an external additive for toner, and fillers for various rubbers, resins, semiconductor encapsulation materials, and films.

Hydrophobized spherical silica, which has a surface subjected to the hydrophobizing treatment, is generally obtained by subjecting a surface of spherical silica obtained by a flame aerosol process or sol-gel method to the hydrophobizing treatment. The hydrophobized spherical silica obtained by the sol-gel method is known to be as follows as compared to the hydrophobized spherical silica obtained by the flame aerosol processe. That is, the former silica has a narrow width of a particle size distribution, i.e., uniformized particle diameters, and hence is easily used for design of a filling material. However, the silica has a silanol group inside a particle, and hence, even when its surface is subjected to the hydrophobizing treatment, the silica is liable to absorb moisture under high temperature and high humidity, resulting in poor environmental stability.

As one of fine particles to be obtained by the sol-gel method, there is a report of a spherical polyalkylsilsesquioxane fine particle manufactured by hydrolyzing an alkyltrialkoxysilane serving as a raw material. The polyalkylsilsesquioxane fine particle has hydrophobic alkyl groups on its particle surface and inside itself. Accordingly, the polyalkylsilsesquioxane fine particle hardly absorbs moisture, resulting in excellent environmental stability, and hence is very useful. As a method of manufacturing such polymethylsilsesquioxane particle, for example, in Patent Literature 1, there is a report that, for use in an external additive for toner, a truly spherical polymethylsilsesquioxane particle is obtained by hydrolyzing and condensing a methyltrialkoxysilane under a basic atmosphere. In addition, in Patent Literature 2, there is a report of a water or water/organic solvent dispersion liquid containing a spherical polyorganosilsesquioxane fine particle having a particle diameter of about 0.1 μm, and a fine particle collected by centrifuging the dispersion liquid, for use in an additive for a paint or a cosmetic.

In manufacture of the polymethylsilsesquioxane particle by the sol-gel method, stability of a reaction is not sufficient, and hence it is difficult to obtain a particle having a small particle diameter. For example, in Patent Literature 1, there is a disclosure that a truly spherical polymethylsilsesquioxane particle having a particle diameter of from 0.1 μm to 10 μm is obtained, but in Examples, there is only a disclosure that particles having particle diameters of 3.0 μm and 1.9 μm have been obtained.

CITATION LIST

Patent Literature

[PTL 1] JP 63-101854 A
[PTL 2] JP 06-18879 B2

SUMMARY OF INVENTION

Technical Problem

Under the above-mentioned circumstances, the inventors of the present invention have investigated the particle manufacturing method disclosed in Patent Literature 1, and as a result, have found that it is difficult to actually form a particle having a particle diameter of 0.3 μm or less, and even when obtained, the particle is difficult to stably collect as a spherical particle. In addition, the inventors of the present invention have also investigated the particle manufacturing method disclosed in Patent Literature 2, and as a result, have found that the use of a water-soluble organic solvent facilitates the formation of the particle having a particle diameter of 0.3 μm or less, but even in this particle manufacturing method, it is difficult to stably collect particles having uniform particle diameters and shapes.

Meanwhile, in recent years, applications of silica particles have extremely diversified into, for example, an external additive for toner for electrophotography, fillers to be added to various rubbers and resin materials, and additives to be added to cosmetics and waxes. In this connection, a silica particle having hydrophobicity and having a small particle diameter has been required depending on its application or purpose. However, as described above, it is difficult to provide such silica particle (polyalkylsilsesquioxane particle) by the technology described in Patent Literature 1 or 2.

The present invention has been made in view of the above-mentioned circumstances, and an object of the present invention is to provide a polyalkylsilsesquioxane fine particle having hydrophobicity and having a small particle diameter, an external additive for toner and a dry toner for electrophotography each using the same, and a method of manufacturing a hydrophobized spherical polyalkylsilsesquioxane fine particle.

Solution to Problem

The inventors of the present invention have made extensive investigations in order to achieve the above-mentioned object. As a result, the inventors of the present invention have found the following present invention.

That is, according to one embodiment of the present invention, there is provided a hydrophobized spherical polyalkylsilsesquioxane fine particle, which has a mass-based median diameter in a centrifugal sedimentation method within a range of from 0.05 µm to 0.3 µm.

A hydrophobized spherical polyalkylsilsesquioxane fine particle according to one embodiment of the present invention is preferably such that the hydrophobized spherical polyalkylsilsesquioxane fine particle includes a hydrophobized spherical polymethylsilsesquioxane fine particle.

A hydrophobized spherical polyalkylsilsesquioxane fine particle according to another embodiment of the present invention is preferably such that the hydrophobized spherical polyalkylsilsesquioxane fine particle has a disintegration strength in a crushing strength measurement method of 0.20 N or less.

A hydrophobized spherical polyalkylsilsesquioxane fine particle according to another embodiment of the present invention is preferably such that the hydrophobized spherical polyalkylsilsesquioxane fine particle has a ratio of a mass-based 90% cumulative diameter (D90 diameter) to a mass-based 10% cumulative diameter (D10 diameter) (D90 diameter/D10 diameter) within a range of from 1.5 to 4.0 in a mass-based particle size distribution to be obtained by the centrifugal sedimentation method.

A hydrophobized spherical polyalkylsilsesquioxane fine particle according to another embodiment of the present invention is preferably such that the hydrophobized spherical polyalkylsilsesquioxane fine particle has a degree of hydrophobicity in a methanol titration method of 55 vol % or more, and has a floating ratio in methanol water having a methanol concentration of 50 vol % of 80 mass % or more.

According to one embodiment of the present invention, there is provided an external additive for toner, including hydrophobized spherical polysilsesquioxane fine particles having a mass-based median diameter in a centrifugal sedimentation method within a range of from 0.05 µm to 0.3 µm.

According to one embodiment of the present invention, there is provided a dry toner for electrophotography, including: toner particles; and hydrophobized spherical polyalkylsilsesquioxane fine particles having a mass-based median diameter in a centrifugal sedimentation method within a range of from 0.05 µm to 0.3 µm.

According to one embodiment of the present invention, there is provided a method of manufacturing a hydrophobized spherical polyalkylsilsesquioxane fine particle, the hydrophobized spherical polyalkylsilsesquioxane fine particle having a mass-based median diameter in a centrifugal sedimentation method within a range of from 0.05 µm to 0.3 µm, the method including: mixing a raw material solution containing a fine particle precursor selected from the group consisting of (i) a hydrolysate of an alkyltrialkoxysilane, (ii) a partial condensate of the hydrolysate, and (iii) a mixture of the hydrolysate and the partial condensate, and an organic solvent, with an alkaline aqueous medium containing an organic solvent to subject the fine particle precursor to a polycondensation reaction, to thereby obtain a polycondensation reaction liquid; mixing the polycondensation reaction liquid with an aqueous solution, to thereby obtain a spherical polyalkylsilsesquioxane fine particle dispersion liquid having dispersed therein a spherical polyalkylsilsesquioxane fine particle; and blending a hydrophobizing agent in the spherical polyalkylsilsesquioxane fine particle dispersion liquid to subject a surface of the spherical polyalkylsilsesquioxane fine particle to hydrophobizing treatment.

A method of manufacturing a hydrophobized spherical polyalkylsilsesquioxane fine particle according to one embodiment of the present invention is preferably such that the following expression (1) is satisfied.

$$100 \times (OS1+OS2)/(L1+L2) \geq 50 \text{ mass \%} \quad \text{Expression (1)}$$

(In the expression (1): OS1 represents a content (g) of the organic solvent contained in the raw material solution used in preparation of the polycondensation reaction liquid; OS2 represents a content (g) of the organic solvent contained in the alkaline aqueous medium used in preparation of the polycondensation reaction liquid; L1 represents an amount (g) of the raw material solution used in preparation of the polycondensation reaction liquid; and L2 represents an amount (g) of the alkaline aqueous medium used in preparation of the polycondensation reaction liquid.)

A method of manufacturing a hydrophobized spherical polyalkylsilsesquioxane fine particle according to another embodiment of the present invention is preferably such that the alkyltrialkoxysilane includes methyltrimethoxysilane.

A method of manufacturing a hydrophobized spherical polyalkylsilsesquioxane fine particle according to another embodiment of the present invention is preferably such that the mixing of the polycondensation reaction liquid with the aqueous solution is performed so that a composition of a mixed liquid obtained by mixing the polycondensation reaction liquid with the aqueous solution is always kept constant with respect to a lapse of time.

A method of manufacturing a hydrophobized spherical polyalkylsilsesquioxane fine particle according to another embodiment of the present invention is preferably such that the mixing of the polycondensation reaction liquid with the aqueous solution is performed by continuously supplying the polycondensation reaction liquid in a constant flow amount from an inlet side of a first flow passage of three flow passages trifurcated from a connecting portion toward a connecting portion side, and continuously supplying the aqueous solution in a constant flow amount from an inlet side of a second flow passage of the three flow passages toward the connecting portion side.

A method of manufacturing a hydrophobized spherical polyalkylsilsesquioxane fine particle according to another embodiment of the present invention is preferably such that the mixing of the polycondensation reaction liquid with the aqueous solution is performed so that a composition of a mixed liquid obtained by mixing the polycondensation reaction liquid with the aqueous solution changes with a lapse of time.

A method of manufacturing a hydrophobized spherical polyalkylsilsesquioxane fine particle according to another embodiment of the present invention is preferably such that the mixing of the polycondensation reaction liquid with the aqueous solution is performed by dropping a droplet of the polycondensation reaction liquid to a liquid surface of the aqueous solution placed in a container.

Advantageous Effects of Invention

According to the present invention, the polyalkylsilsesquioxane fine particle having hydrophobicity and having a small particle diameter, the external additive for toner and the dry toner for electrophotography (hereinafter sometimes simply referred to as "toner") each using the same, and the method of manufacturing a hydrophobized spherical polyalkylsilsesquioxane fine particle can be provided.

DESCRIPTION OF EMBODIMENTS

Figure 1:
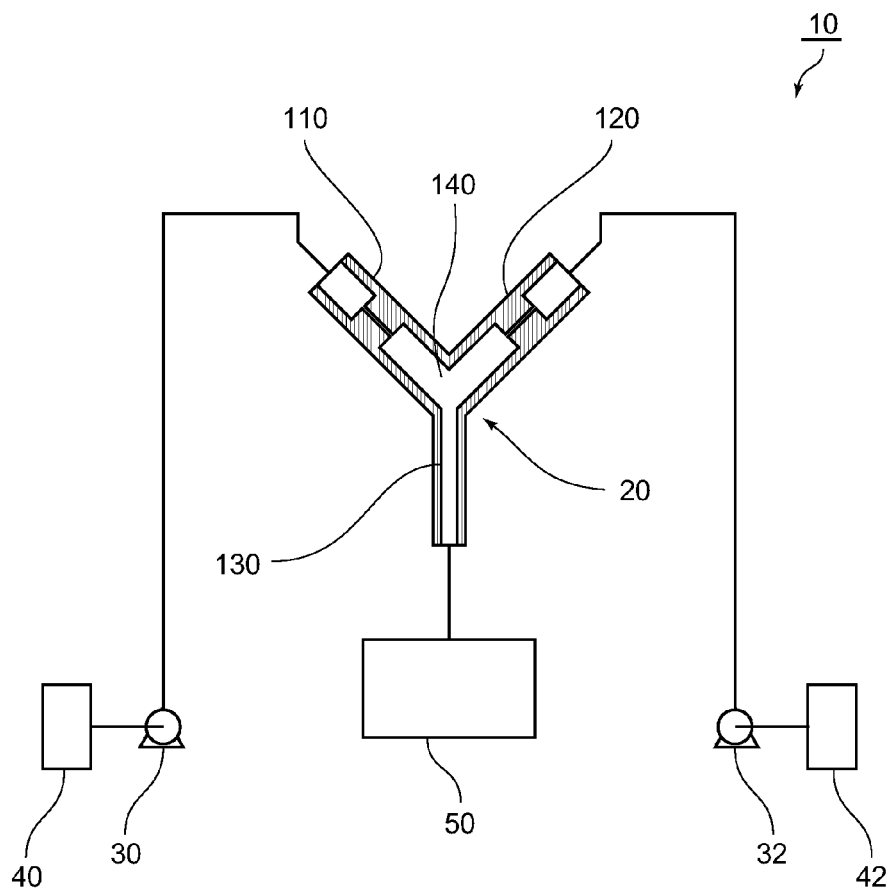
FIG. 1 is a general schematic view for illustrating an example of a reaction apparatus to be used in a method of manufacturing a hydrophobized spherical polyalkylsilsesquioxane fine particle according to one embodiment of the present invention.

A hydrophobized spherical polyalkylsilsesquioxane fine particle according to one embodiment of the present invention has a mass-based median diameter in a centrifugal sedimentation method within the range of from 0.05 μm to 0.3 μm. That is, as described above, in the manufacture of a polymethylsilsesquioxane fine particle by a related-art sol-gel method, when an attempt is made to obtain a particle having a small particle diameter, a reaction cannot be stably conducted. Thus, the particle in the form of a fine particle is provided for the first time by the present invention.

The mass-based median diameter may be determined by measurement based on the centrifugal sedimentation method. Specifically, 0.1 g of dried hydrophobized spherical polyalkylsilsesquioxane fine particles were loaded into a container made of glass having an inner diameter of 4 cm and a height of 11 cm, and 50 g of 2-propanol was added thereto to provide a solution. Next, 4.5 cm of a probe (inner diameter of end: 7 mm) of an ultrasonic disperser from its end was immersed in the solution, and ultrasonic dispersion was performed at an output of 20 W for 15 minutes to provide a dispersion liquid. Then, the dispersion liquid was used to measure a median diameter with a centrifugal sedimentation particle size distribution measurement apparatus DC24000 manufactured by CPS Instruments, Inc. The number of rotations of its disc was set to 24,000 rpm, and the true density of polyalkylsilsesquioxane was set to 1.3 g/cm$^3$. Prior to the measurement, the apparatus was calibrated using polyvinyl chloride particles having an average particle diameter of 0.476 μm. According to the centrifugal sedimentation method described above, even for particles having such a particle diameter range that their median diameter falls within the range of from about 0.05 μm to about 0.3 μm, the particle diameters of independent individual particles can be measured with high precision.

As described above, the hydrophobized spherical polyalkylsilsesquioxane fine particle according to this embodiment has a small particle diameter, i.e., a particle diameter of 0.3 μm or less, and has hydrophobicity. Such particle diameter size is relatively small as compared to the wavelength region of visible light, and hence the hydrophobized spherical polyalkylsilsesquioxane fine particle according to this embodiment hardly degrades transparency even when mixed with any other material having transparency. In addition, the addition of the hydrophobized spherical polyalkylsilsesquioxane fine particle according to this embodiment to a liquid material, for example, a resin solution, tends to make it easier to reduce viscosity depending on the particle diameter size. In addition, the hydrophobized spherical polyalkylsilsesquioxane fine particle according to this embodiment contains a hydrophobic alkyl group in its fine particle main body and has been subjected to hydrophobizing treatment, and hence has hydrophobicity. Accordingly, the hydrophobized spherical polyalkylsilsesquioxane fine particle according to this embodiment is less liable to be influenced by humidity, and hence is advantageous in terms of weatherability and environmental stability as well.

Although applications of the hydrophobized spherical polyalkylsilsesquioxane fine particle according to this embodiment are not particularly limited, in consideration of the above-mentioned respects, the hydrophobized spherical polyalkylsilsesquioxane fine particle according to this embodiment is preferably used for, for example, fillers for various rubbers and resins, fillers for semiconductor encapsulation materials and films, an external additive for toner for electrophotography, additives for modifying cosmetics, waxes, paints, plastics, rubbers, cosmetics, and paper, and an abrasive to be utilized in a semiconductor fabrication process. When used as a filler for any of various rubbers and resins, the hydrophobized spherical polyalkylsilsesquioxane fine particle according to this embodiment can make it easier to reduce the viscosity of any such material and secure the transparency thereof. In addition, as a filler for, for example, a semiconductor encapsulation material or a film, along with downsizing and thinning of devices in recent years, there has been a need for silica particles which are excellent in weatherability and have uniformized particle sizes and particle diameters of 0.3 μm or less, and the hydrophobized spherical polyalkylsilsesquioxane fine particle according to this embodiment can also meet such need. In a cosmetic or a wax, it is useful to use a silica particle having water repellency. Further, in an external additive for toner, along with a reduction in particle diameter of toner for the purposes of an increase in speed of printing, the expansion of the use of color toner, and high-definition image formation, there has been a need for a hydrophobized fine particle having a particle diameter of 0.3 μm or less. In addition, the toner is also required to have excellent environmental stability. In those respects, the hydrophobized spherical polyalkylsilsesquioxane fine particle according to this embodiment is particularly suitably used as an external additive for toner. In addition, the securement of environmental stability also contributes to the securement of the charging stability of toner.

The median diameter of the hydrophobized spherical polyalkylsilsesquioxane fine particle according to this embodiment only needs to be from 0.05 μm to 0.30 μm, and in general, is preferably from 0.08 μm to 0.25 μm, more preferably from 0.08 μm to 0.20 μm. It should be noted that the median diameter may be appropriately selected within the range of from 0.05 μm to 0.30 μm depending on the applications of the hydrophobized spherical polyalkylsilsesquioxane fine particle according to this embodiment.

In the case of using the hydrophobized spherical polyalkylsilsesquioxane fine particle according to this embodiment as an external additive for toner, when its median diameter is less than 0.05 μm, particularly in a toner having a reduced melting point in recent years, external additive particles are liable to be buried in the toner, with the result that improving effects on the transferability and durability of the toner are not obtained. In addition, when the median diameter is more than 0.30 μm, in a toner having a reduced particle diameter in recent years, the external additive particles do not easily cover toner particle surfaces, with the result that the durability and transferability of the toner are reduced. Further, even when the external additive particles cover the toner particle surfaces, the external additive particles are liable to be detached from the toner particle surfaces, and the detached external additive particles may cause damage to a photoreceptor or a defect in image quality.

Further, the hydrophobized spherical polyalkylsilsesquioxane fine particle has a ratio of a mass-based 90% cumulative diameter (D90 diameter) to a mass-based 10% cumulative diameter (D10 diameter) (hereinafter sometimes referred to as "D90 diameter/D10 diameter") within preferably the range of from 1.5 to 4.0, more preferably from 1.5 to 3.0 in a mass-based particle size distribution obtained by the centrifugal sedimentation method. Particles in which the ratio (D90 diameter/D10 diameter) is small as described above have a narrow width of a particle size distribution, and can be suitably used in the design of a filler involving, for example, mixing several kinds of fillers different from each other in particle diameter. Meanwhile, the case where the ratio (D90 diameter/D10 diameter) is more than 4.0 means that the width of the particle size distribution is wide. Accordingly, it sometimes becomes difficult to use the hydrophobized spherical polyalkylsilsesquioxane fine particle according to this embodiment in an application in which a narrow width of the particle size distribution is required. For example, when hydrophobized spherical polyalkylsilsesquioxane fine particles in which the (D90 diameter/D10 diameter) is more than 4.0 are used as an external additive for toner, an excessive amount of external additive particles need to be added in order to obtain an effect on transferability, resulting in a deterioration in economic efficiency in some cases. In addition, the external additive particles contain coarse particles and also have a variation in particle diameter, and hence the dispersibility of the external additive particles in toner is deteriorated in some cases.

The hydrophobized spherical polyalkylsilsesquioxane fine particle according to this embodiment is a fine particle obtained by hydrophobizing the surface of a fine particle main body formed of a basic structure represented by the following general formula (1) with a hydrophobizing agent.

$$R^1SiO_{3/2}$$ General formula (1)

(In the general formula (1), $R^1$ represents any one of an alkyl group and a cyclic alkyl group.)

In the hydrophobized spherical polyalkylsilsesquioxane fine particle according to this embodiment, as the alkyl group $R^1$ to be bonded to the silicon atom, for example, a substituted or unsubstituted, monovalent, chain or cyclic alkyl group may be applied without any limitation. Suitably, an alkyl group having 1 to 10 carbon atoms is preferred, and specific examples thereof may include chain alkyl groups, such as a methyl group, an ethyl group, a propyl group, a butyl group, and a hexyl group, and cyclic alkyl groups, such as a cyclohexyl group and a cyclooctyl group. Of those, a chain alkyl group having 1 to 3 carbon atoms is particularly suitable, and a methyl group is most preferred.

The hydrophobized spherical polyalkylsilsesquioxane fine particle according to this embodiment has a nearly truly spherical shape, and specifically, has an average circularity of preferably 0.8 or more, more preferably 0.90 or more. Herein, the average circularity means the average circularity of primary particles obtained by analyzing image data obtained with a field-emission scanning electron microscope (FE-SEM) through the use of image analysis software to determine the circumferences and projected areas of particles (50% circularity at a cumulative frequency of 50% of circularity calculated by the following expression (2) of 100 primary particles obtained by the image analysis).

$$\text{Circularity}=4\pi\times(A/I^2)$$ Expression (2)

(In the expression (2), I represents the circumference (nm) of a primary particle on an image, and A represents the projected area (nm²) of the primary particle.)

As the average circularity of the primary particles becomes closer to 1, it is indicated that the particles are closer to true spheres, but the average circularity is at most about 0.97. When the average circularity of the primary particles is less than 0.80, adhesion between hydrophobized spherical polyalkylsilsesquioxane fine particles is increased to deteriorate the disintegrability of an aggregate mass of the hydrophobized spherical polyalkylsilsesquioxane fine particles in some cases. In addition, when the hydrophobized spherical polyalkylsilsesquioxane is used as an external additive for toner, releasability from a fixing member tends to be deteriorated.

In addition, the hydrophobized spherical polyalkylsilsesquioxane fine particle according to this embodiment is such that the surface of the fine particle main body formed of the basic structure represented by the general formula (1) has been subjected to hydrophobizing treatment with a hydrophobizing agent. The hydrophobizing agent for subjecting the surface of the fine particle main body to the hydrophobizing treatment is not particularly limited, but is preferably an organic silicon compound. Examples thereof may include: alkylsilazane-based compounds, such as hexamethyldisilazane; alkylalkoxysilane-based compounds, such as dimethyldimethoxysilane, diethyldiethoxysilane, trimethylmethoxysilane, methyltrimethoxysilane, and butyltrimethoxysilane; chlorosilane-based compounds, such as dimethyldichlorosilane and trimethylchlorosilane; a silicone oil; and a silicone varnish. The hydrophobizing treatment of the surface of the fine particle main body can improve the hydrophobicity of the hydrophobized spherical polyalkylsilsesquioxane fine particle according to this embodiment and the disintegrability of the aggregate mass formed of the hydrophobized spherical polyalkylsilsesquioxane fine particle according to this embodiment to improve its dispersibility in a resin. In addition, when the hydrophobized spherical polyalkylsilsesquioxane fine particle according to this embodiment is used as an external additive for toner, a dry toner for electrophotography having charging stability which is stable without being influenced by environmental conditions like high temperature and high humidity can be obtained.

The degree of hydrophobicity of the hydrophobized spherical polyalkylsilsesquioxane fine particle according to this embodiment is preferably 55 vol % or more in terms of degree of hydrophobicity in a methanol titration method. The degree of hydrophobicity in the methanol titration method is measured by the following procedure. That is, in a mixed liquid obtained by adding 0.2 g of the hydrophobized spherical polyalkylsilsesquioxane fine particles into 50 ml of water, until the whole amount of the hydrophobized spherical polyalkylsilsesquioxane fine particles is wetted, methanol is dropped from a burette to the stirred mixed liquid. Whether or not the whole amount is wetted is judged by whether or not all the hydrophobized spherical polyalkylsilsesquioxane fine particles which have floated on a water surface are submerged in the liquid and suspended in the liquid. In this case, the value for the percentage of methanol with respect to the total amount of the mixed liquid and dropped methanol at the time of the completion of the dropping is defined as the degree of hydrophobicity. A higher value for the degree of hydrophobicity indicates higher hydrophobicity. The degree of hydrophobicity of the hydrophobized spherical polyalkylsilsesquioxane fine particle according to this embodiment is particularly preferably from 55 vol % to 75 vol %.

Further, the hydrophobized spherical polyalkylsilsesquioxane fine particle according to this embodiment preferably has a floating ratio of the hydrophobized spherical polyalkylsilsesquioxane fine particle in methanol water having a methanol concentration of 50 vol % of 80 mass % or more. The floating ratio may be measured by the following procedure. That is, 100 ml of 50 vol % methanol water and 0.5 g of the hydrophobized spherical polyalkylsilsesquioxane fine particles are loaded into a 110 ml screw-capped vial, mixed with a shaker for 30 minutes, and left at rest overnight. A slurry containing wetted and settled hydrophobized spherical polyalkylsilsesquioxane fine particles is removed with a dropper, and powder and liquid floating on the solution are dried at 70° C. for 2 hours and at 120° C. for 15 hours to provide residual fine particles remaining in the screw-capped vial. Then, the percentage of the mass (g) of the residual fine particles with respect to the loading amount (0.5 g) is measured as the floating ratio. The floating ratio of the hydrophobized spherical polyalkylsilsesquioxane fine particle according to this embodiment is particularly preferably from 80 mass % to 90 mass %.

When the hydrophobized spherical polyalkylsilsesquioxane fine particle has a degree of hydrophobicity of 55 vol % or more and a floating ratio of 80 mass % or more, the surface of the hydrophobized spherical polyalkylsilsesquioxane fine particle is more uniformly subjected to the hydrophobizing treatment. Accordingly, when the hydrophobized spherical polyalkylsilsesquioxane fine particle is used as any of various additives, dispersibility in a resin is excellent. In addition, when the hydrophobized spherical polyalkylsilsesquioxane fine particle is used as an external additive for toner, the charging stability of a dry toner for electrophotography is improved. Meanwhile, a hydrophobized spherical polyalkylsilsesquioxane fine particle having a degree of hydrophobicity of less than 55 vol % has a high saturated water content and is liable to absorb moisture depending on environmental conditions. Accordingly, for example, when such particle is used as an external additive for toner, charging stability becomes insufficient in some cases. In addition, when the degree of hydrophobicity is less than 55 vol % and/or the floating ratio is less than 80 mass %, the hydrophobized spherical polyalkylsilsesquioxane fine particles are liable to generate a firm aggregate together owing to hydrogen bonding between silanol groups on the surfaces of the particles, and hence dispersibility in a resin is reduced or the fluidity of the resin is liable to be reduced in some cases. In addition, when the above-mentioned hydrophobized spherical polyalkylsilsesquioxane fine particles are used as an external additive for toner, aggregated particles thereof do not easily cover the surfaces of toner particles, with the result that their effect as an external additive for toner is not easily exhibited.

Next, a method of manufacturing the hydrophobized spherical polyalkylsilsesquioxane fine particle according to this embodiment is described. The method of manufacturing the hydrophobized spherical polyalkylsilsesquioxane fine particle according to this embodiment is not limited to a particular method. However, when an alkyltrialkoxysilane is hydrolyzed and polycondensed by a related-art sol-gel method, it is generally difficult to stably obtain a particle having a small particle diameter like the hydrophobized spherical polyalkylsilsesquioxane fine particle according to this embodiment. Therefore, the hydrophobized spherical polyalkylsilsesquioxane fine particle is preferably manufactured by the following method. That is, specifically, the method of manufacturing the hydrophobized spherical polyalkylsilsesquioxane fine particle according to this embodiment is preferably a manufacturing method including: mixing a raw material solution containing a fine particle precursor selected from the group consisting of (i) a hydrolysate of an alkyltrialkoxysilane, (ii) a partial condensate of the hydrolysate, and (iii) a mixture of the hydrolysate and the partial condensate, and an organic solvent, with an alkaline aqueous medium containing an organic solvent to subject the fine particle precursor to a polycondensation reaction, to thereby obtain a polycondensation reaction liquid; mixing the polycondensation reaction liquid with an aqueous solution, to thereby obtain a spherical polyalkylsilsesquioxane fine particle dispersion liquid having dispersed therein a spherical polyalkylsilsesquioxane fine particle; and blending a hydrophobizing agent in the spherical polyalkylsilsesquioxane fine particle dispersion liquid to subject a surface of the spherical polyalkylsilsesquioxane fine particle to hydrophobizing treatment.

In the above-mentioned manufacturing method, as the first step, a raw material solution containing a fine particle precursor selected from the group consisting of (i) a hydrolysate of an alkyltrialkoxysilane, (ii) a partial condensate of the hydrolysate, and (iii) a mixture of the hydrolysate and the partial condensate, and an organic solvent is obtained. The raw material solution may be a primary solution containing the fine particle precursor directly obtained by allowing the hydrolysis reaction or partial condensation reaction of a starting raw material used in the production of the fine particle precursor to proceed, or may be a secondary solution obtained by diluting the primary solution through further addition of water or an organic solvent thereto. In addition, the primary solution contains at least the fine particle precursor and an alcohol generated by the hydrolysis of the alkyltrialkoxysilane (that is, an organic solvent). However, in addition to those components, the primary solution generally contains water and an acid used as a catalyst. In addition to the alcohol generated by, for example, the hydrolysis of the alkyltrialkoxysilane, the organic solvent of the primary solution may further contain an organic solvent to be used as necessary as a starting raw material.

In this case, an example of the organic solvent contained in the raw material solution is at least the alcohol generated by the hydrolysis of the alkyltrialkoxysilane. Examples of such alcohol, which varies depending on the kind of the alkyltrialkoxysilane to be used, include methanol, ethanol, and propanol. In addition, as each of the organic solvent to be used as necessary as the starting raw material and the organic solvent to be used as necessary in the preparation of the secondary solution, any of solvents listed as the organic solvent to be used in the preparation of the alkaline aqueous medium to be described later may be appropriately selected.

Herein, the alkyltrialkoxysilane is a compound represented by the following general formula (2).

$$R^1Si(OR^2)_3 \qquad \text{General formula (2)}$$

(In the general formula (2), $R^1$ and $R^2$ each represent any one of an alkyl group and a cyclic alkyl group, and $R^1$ and $R^2$ may be identical to or different from each other.)

In addition, the hydrolysate of the alkyltrialkoxysilane is a compound represented by the following general formula (3), which is obtained by hydrolyzing the alkyltrialkoxysilane. In addition, the partial condensate is a compound obtained by condensing the compounds represented by the general formula (2) and/or the following general formula (3) with each other.

$$R^1Si(OR^2)_a(OH)_{3-a} \qquad \text{General formula (3)}$$

(In the general formula (3), $R^1$ and $R^2$ are the same as those shown in the general formula (2), and a represents an integer of from 0 to 2.)

Examples of the alkyltrialkoxysilane may include methyltrimethoxysilane, methyltriethoxysilane, methyltriisopropoxysilane, methyltris(methoxyethoxy)silane, ethyltrimethoxysilane, n-propyltriethoxysilane, n-butyltrimethoxysilane, isobutyltrimethoxysilane, isobutyltriethoxysilane, n-hexylmethoxysilane, n-hexyltriethoxysilane, and cyclohexyltrimethoxysilane. One kind of those alkyltrialkoxysilanes may be used alone, or two or more kinds thereof may be used in combination.

Of those, in particular, methyltrimethoxysilane is more preferred because of the ease of industrial availability and the ease of handling.

In addition, when the alkyltrialkoxysilane is liquid under ordinary temperature and ordinary pressure, the alkyltrialkoxysilane may be used as it is, or may be used after being diluted with an organic solvent.

The first step is performed by bringing the alkyltrialkoxysilane into contact with an acid serving as a catalyst in an aqueous solution obtained by dissolving the acid in water by stirring, mixing, or any other method.

A known catalyst may be suitably used as the catalyst. Specific examples thereof include: inorganic acids, such as hydrochloric acid, nitric acid, and sulfuric acid; and organic acids, such as formic acid, acetic acid, oxalic acid, citric acid, and propionic acid.

Of those, organic acids, such as formic acid and acetic acid, are preferably used because an impurity is prevented from being incorporated into the hydrophobized spherical polyalkylsilsesquioxane fine particle to be finally obtained or, even when the impurity is incorporated, its amount is small and the generated hydrolysate is less liable to undergo a partial condensation reaction.

The usage amount of the catalyst may be appropriately adjusted depending on the kinds of the alkyltrialkoxysilane and the acid, and is selected from the range of from $1 \times 10^{-3}$ part by mass to 1 part by mass with respect to 100 parts by mass of the amount of water to be used in the hydrolysis of the alkyltrialkoxysilane. When the usage amount of the catalyst is less than $1 \times 10^{-3}$ part by mass, the reaction does not sufficiently proceed, and when the usage amount is more than 1 part by mass, not only the concentration of the catalyst remaining as an impurity in the fine particle is increased, but also the generated hydrolysate is liable to be condensed. The usage amount of water is preferably from 2 mol to 15 mol with respect to 1 mol of the alkyltrialkoxysilane. When the amount of water is less than 2 mol, the hydrolysis reaction does not sufficiently proceed, and the use of water in an amount of more than 15 mol may deteriorate productivity.

A reaction temperature is not particularly limited, and the reaction may be performed at ordinary temperature or under a heated state. The reaction is preferably performed under a state in which the temperature is kept at from 10° C. to 60° C. because the hydrolysate is obtained in a short period of time and the partial condensation reaction of the generated hydrolysate can be suppressed. A reaction time is not particularly limited, and may be appropriately selected in consideration of the reactivity of the alkyltrialkoxysilane to be used, the composition of the reaction liquid obtained by blending the alkyltrialkoxysilane, the acid, and water, and productivity.

In the method of manufacturing the hydrophobized spherical polyalkylsilsesquioxane fine particle according to this embodiment, as the second step, the raw material solution obtained in the first step is mixed with an alkaline aqueous medium containing an organic solvent to subject the fine particle precursor to a polycondensation reaction. Thus, a polycondensation reaction liquid is obtained. In this case, the alkaline aqueous medium is a liquid obtained by mixing an alkali component, water, and an organic solvent.

The alkali component to be used for the alkaline aqueous medium is as follows: its aqueous solution shows basicity and the alkali component acts as a neutralizing agent for the acid used in the first step or as a catalyst for the polycondensation reaction in the second step. Examples of such alkali component may include: alkali metal hydroxides, such as lithium hydroxide, sodium hydroxide, and potassium hydroxide; ammonia; and organic amines, such as monomethylamine and dimethylamine. Of those, ammonia and organic amines are preferred because of not leaving a trace amount of an impurity which limits the applications of the hydrophobized spherical polyalkylsilsesquioxane fine particle according to this embodiment, and ammonia is particularly preferred because of the ease of removal of the impurity. Any such alkali component is preferably used in the form of an aqueous solution because of the ease of handling or reaction control.

The usage amount of the alkali component is such an amount that the alkali component neutralizes the acid and effectively acts as the catalyst for the polycondensation reaction. For example, when ammonia is used as the alkali component, the usage amount is generally selected from the range of 0.01 mass % or more and 12.5 mass % or less with respect to 100 parts by mass of the mixture of water and the organic solvent. When the usage amount of the alkali component is less than 0.01 mass %, in the subsequent third step, the spherical polyalkylsilsesquioxane fine particle is difficult to obtain and its yield is liable to be reduced. In addition, when the usage amount of the alkali component is more than 12.5 mass %, a precipitate is liable to be generated, and hence a homogeneous reaction liquid is difficult to obtain, with the result that, in the subsequent third step, the generation of the spherical polyalkylsilsesquioxane fine particle may become unstable. In addition, the treatment of a waste liquid is liable to be complicated.

In the second step, in order to prepare the alkaline aqueous medium, the organic solvent is further used in addition to the alkali component and water. Such organic solvent is not particularly limited as long as the organic solvent has compatibility with water, but an organic solvent capable of dissolving 10 g or more of water per 100 g under ordinary temperature and ordinary pressure is suitable. Specific examples thereof include: alcohols, such as methanol, ethanol, n-propanol, 2-propanol, and butanol; polyhydric alcohols, such as ethylene glycol, diethylene glycol, propylene glycol, glycerin, trimethylolpropane, and hexanetriol; ethers, such as ethylene glycol monoethyl ether, acetone, diethyl ether, tetrahydrofuran, and diacetone alcohol; and amide compounds, such as dimethylformamide, dimethylacetamide, and N-methylpyrrolidone.

Of those organic solvents listed above, alcohol-based solvents, such as methanol, ethanol, 2-propanol, and butanol, are preferred. Further, from the viewpoint of hydrolysis and dehydration condensation reactions, the same alcohol as the alcohol to be generated by elimination is more preferably selected as the organic solvent.

In addition, in the second step, from the viewpoint of suppressing the generation of a precipitate to make it easier to obtain a more homogeneous polycondensation reaction liquid, the following expression (1) is preferably satisfied.

$$100 \times (OS1+OS2)/(L1+L2) \geq 50 \text{ mass \%} \qquad \text{Expression (1)}$$

(In the expression (1): OS1 represents a content (g) of the organic solvent contained in the raw material solution used in preparation of the polycondensation reaction liquid; OS2 represents a content (g) of the organic solvent contained in the alkaline aqueous medium used in preparation of the polycondensation reaction liquid; L1 represents an amount (g) of the raw material solution used in preparation of the polycondensation reaction liquid; and L2 represents an amount (g) of the alkaline aqueous medium used in preparation of the polycondensation reaction liquid.)

As described above, the content of the organic solvent represented as OS1 in the expression (1) inevitably includes at least the content of the alcohol generated by the hydrolysis of the alkyltrialkoxysilane, and may further include the content of an organic solvent to be further used optionally (the organic solvent used in the starting raw material or the organic solvent used in the preparation of the secondary solution). In this connection, in the determination of the value for OS1, as the amount of the alcohol generated by the hydrolysis of the alkyltrialkoxysilane, there is adopted the amount of the alcohol to be generated when the hydrolysis of the alkyltrialkoxysilane is assumed to have proceeded 100%.

The organic solvent content ratio $A\{=100\times(OS1+OS2)/(L1+L2)\}$ shown on the left side of the expression (1) is more preferably 58 mass % or more, still more preferably 65 mass % or more. In addition, the upper limit value thereof is not particularly limited, but is preferably 90 mass % or less in terms of practical use.

In addition, from the viewpoint of suppressing the generation of a precipitate to make it easier to obtain a more homogeneous polycondensation reaction liquid, the content percentage of the organic solvent in the alkaline aqueous medium is preferably 50 mass % or more, more preferably 60 mass % or more. In addition, the upper limit value thereof is not particularly limited, but is preferably 99.5 mass % or less, more preferably 90 mass % or less.

A method of mixing the raw material solution with the alkaline aqueous medium is not particularly limited, and a known method, such as a dropping method, may be used. When the alkaline aqueous medium and the raw material solution are mixed by adding the raw material solution in small amounts into the alkaline aqueous medium by the dropping method or the like, the addition of the raw material solution into the alkaline aqueous medium may be appropriately adjusted in consideration of a manufacture scale and the like, but is performed preferably in 10 minutes or less, more preferably in 5 minutes or less. When the addition rate is excessively low, there is a tendency that a precipitate is generated in the liquid before the completion of the addition of the whole amount of the raw material solution to the alkaline aqueous medium to preclude a homogeneous polycondensate from being obtained, and the sphericity of the spherical polyalkylsilsesquioxane fine particle to be obtained in the subsequent third step or the like is reduced.

A temperature during the mixing of the raw material solution with the alkaline aqueous medium is suitably selected from the range of from 5° C. to 90° C. in consideration of the composition of the raw material solution and the composition of the alkaline aqueous medium.

A reaction time after the mixing may be appropriately determined in consideration of, for example, the reaction temperature, the composition of the raw material solution, and the composition of the alkaline aqueous medium. The reaction time is preferably equal to or longer than a period of time in which turbidity is generated in a transparent reaction liquid and shorter than a period of time in which a precipitate starts to be generated in the reaction liquid. For example, in the conditions of Example 1-1 to be described later, a reaction time of from 15 minutes to 50 minutes is suitably selected. When the period of time for which the mixing is performed is excessively short, the sphericity of the spherical polyalkylsilsesquioxane fine particle to be obtained in the subsequent third step is reduced or the yield of the spherical polyalkylsilsesquioxane fine particle is reduced. When the period of time for which the mixing is performed is excessively long, there is a tendency that a precipitate is generated in the reaction liquid to preclude a homogeneous polycondensation reaction liquid from being obtained, and the sphericity of the spherical polyalkylsilsesquioxane fine particle to be obtained in the subsequent third step or the like is reduced.

Next, in the method of manufacturing the hydrophobized spherical polyalkylsilsesquioxane fine particle according to this embodiment, as the third step, the polycondensation reaction liquid obtained in the second step is mixed with an aqueous solution, to thereby obtain a spherical polyalkylsilsesquioxane fine particle dispersion liquid having dispersed therein a spherical polyalkylsilsesquioxane fine particle. That is, also in the polycondensation reaction in the second step, the spherical polyalkylsilsesquioxane fine particle can be generated to some extent. However, as described above, when an attempt is made to generate a spherical polyalkylsilsesquioxane fine particle having a small particle diameter, i.e., a particle diameter of 0.3 μm or less, it is difficult to stably manufacture the spherical polyalkylsilsesquioxane fine particle by merely performing the polycondensation reaction in the second step. In contrast, when the polycondensation reaction liquid obtained by the polycondensation reaction in the second step is further mixed with the aqueous solution, a spherical polyalkylsilsesquioxane fine particle having a satisfactory spherical property and having a median diameter within the range of from 0.05 μm to 0.3 μm can be stably generated in the mixed liquid obtained by mixing the polycondensation reaction liquid with the aqueous solution.

In order to complete the formation of spherical polyalkylsilsesquioxane into a particle, it is desired that the mixed liquid obtained by mixing the polycondensation reaction liquid with the aqueous solution be kept in a stirred state. In this case, the stirring temperature of the mixed liquid is not particularly limited, and the stirring may be performed at ordinary temperature or under a heated state. From the viewpoint that the particle formation can be performed in a short period of time, it is desired that the stirring be performed under a state in which the temperature is kept at from 20° C. to 70° C. A stirring time is appropriately selected in consideration of the reactivity of the raw material solution to be used, the composition of the mixed liquid, and productivity. For example, when the alkyltrialkoxysilane to be used contains a methyl group as $R^1$ of the general formula (2), the stirring time is preferably from 0.5 hour to 24 hours, and when $R^1$ represents an ethyl group, the stirring time is preferably from 2 hours to 48 hours.

As the aqueous solution to be used for the mixing with the polycondensation reaction liquid, water (e.g., tap water or pure water) may be utilized. As long as a spherical polyalkylsilsesquioxane fine particle suitable for obtaining the hydrophobized spherical polyalkylsilsesquioxane fine particle according to this embodiment is obtained, any of components each showing compatibility with water, such as a salt, an acid, an alkali, an organic solvent, a surfactant, and a water-soluble polymer, may be further added to the water. When the aqueous solution contains an organic solvent, the content of the organic solvent is preferably adjusted so as to be 30 mass % or less, more preferably 15 mass % or less in the mixed liquid after the completion of the mixing of the whole amount of the polycondensation reaction liquid with the whole amount of the aqueous solution. The temperature of each of the polycondensation reaction liquid and the aqueous solution during their mixing is not particularly limited, and is suitably selected from the range of from 5° C. to 90° C. in consideration of, for example, their compositions and productivity.

A method of mixing the polycondensation reaction liquid with the aqueous solution is not particularly limited, and a known mixing method may be used. However, the mixing is preferably performed in a mode described in the following first mixing method or second mixing method.

(I) First Mixing Method

A mixing method involving mixing the polycondensation reaction liquid with the aqueous solution so that the composition of the mixed liquid obtained by mixing the polycondensation reaction liquid with the aqueous solution changes with a lapse of time (II) Second Mixing Method A mixing method involving mixing the polycondensation reaction liquid with the aqueous solution so that the composition of the mixed liquid obtained by mixing the polycondensation reaction liquid with the aqueous solution is always kept constant with respect to a lapse of time In the above-mentioned methods (I) and (II), the "composition of the mixed liquid" means a composition with reference to a time point immediately after the mixing of the polycondensation reaction liquid with the aqueous solution.

Specific examples of the first mixing method include: i) a method involving dropping a droplet of the polycondensation reaction liquid to the liquid surface of the aqueous solution placed in a container; ii) a method involving spraying the polycondensation reaction liquid in the form of a mist to the liquid surface of the aqueous solution placed in a container; and iii) a method involving supplying the polycondensation reaction liquid from a liquid delivery tube into the aqueous solution placed in a container. A droplet dropping apparatus, such as a burette or a shower head, may be used for the dropping, and a liquid spraying apparatus utilizing a spray nozzle, an ultrasonic oscillator, or the like may be used for the spraying in the form of a mist. Instead of dropping a droplet, the droplet may be allowed to land on the liquid surface of the aqueous solution using a droplet ejecting apparatus, such as an inkjet head. Of those methods, a dropping method described above in i) is suitable.

In the first mixing method, as exemplified above in i) to iii), the polycondensation reaction liquid can be supplied in small amounts in a time-dependent manner to the aqueous solution placed in advance in a container. In other words, the polycondensation reaction liquid is supplied in small amounts in a stepwise manner to a large volume of the aqueous solution. Accordingly, the composition of the aqueous solution to which the polycondensation reaction liquid has been supplied (that is, the mixed liquid of the polycondensation reaction liquid and the aqueous solution) changes with a lapse of time.

In this connection, the volume ratio Vr of the total volume amount of the aqueous solution to the total volume amount of the polycondensation reaction liquid to be used in the first mixing method (total volume amount of aqueous solution/total volume amount of polycondensation reaction liquid) is preferably at least 1.0 times or more, and particularly preferably falls within the range of from 1.0 times to 4.0 times. In addition, the mass ratio Mr of the total mass of the aqueous solution to the total mass of the polycondensation reaction liquid to be used in the first mixing method (total mass of aqueous solution/total mass of polycondensation reaction liquid) is preferably at least 1.0 times or more, and particularly preferably falls within the range of from 1.0 times to 5.0 times.

In the first mixing method, as described above, the composition of the mixed liquid obtained by mixing the polycondensation reaction liquid with the aqueous solution changes with a lapse of time. Consequently, during a period from the start to completion of the mixing operation, the particle diameter of the spherical polyalkylsilsesquioxane fine particle to be obtained changes along with the progress of time from the start of the mixing to the completion of the mixing. Therefore, widening of the particle size distribution of the spherical polyalkylsilsesquioxane fine particle in the spherical polyalkylsilsesquioxane fine particle dispersion liquid to be obtained in the third step is hard to avoid. In addition, in order to suppress the widening of the particle size distribution even if only slightly, it is desired to reduce the change of the liquid composition of the mixed liquid during the mixing operation as much as possible. To that end, the volume ratio Vr and the mass ratio Mr need to be increased. However, when the volume ratio Vr and the mass ratio Mr are increased, the solid content concentration in the spherical polyalkylsilsesquioxane fine particle dispersion liquid to be obtained in the third step is reduced. Accordingly, the consumption amount of the hydrophobizing agent to be used in the subsequent step, i.e., the fourth step is also increased.

Therefore, in order to narrow the particle size distribution of the spherical polyalkylsilsesquioxane fine particle in the spherical polyalkylsilsesquioxane fine particle dispersion liquid to be obtained in the third step and increase the solid content concentration in the spherical polyalkylsilsesquioxane fine particle dispersion liquid, the second mixing method is preferably used rather than the first mixing method. In the second mixing method, the composition of the mixed liquid obtained by mixing the polycondensation reaction liquid with the aqueous solution is always kept constant with respect to a lapse of time, and hence the particle diameter of the spherical polyalkylsilsesquioxane fine particle to be obtained is easy to keep substantially nearly constant at any time point during the mixing operation. Therefore, the particle size distribution can be narrowed, and further, the volume ratio Vr and the mass ratio Mr do not need to be increased, with the result that the solid content concentration in the spherical polyalkylsilsesquioxane fine particle dispersion liquid to be obtained in the third step is easily increased as well.

Specific examples of the second mixing method include: i) a method involving supplying the polycondensation reaction liquid from a polycondensation reaction liquid-supplying tube to an empty container, and at the same time, supplying the aqueous solution from an aqueous solution-supplying tube thereto to mix the polycondensation reaction liquid with the aqueous solution in the container; and ii) a method involving mixing the polycondensation reaction liquid with the aqueous solution through the use of a trifurcate tube.

In this connection, in the mixing method described above in i), when the flow amount of the polycondensation reaction liquid to be supplied from the polycondensation reaction liquid-supplying tube is made constant and the flow amount of the aqueous solution supplied from the aqueous solution-supplying tube is made constant, the composition of the mixed liquid obtained by the mixing in the container is always kept constant. However, in this method, when the volume of the container is increased, local unevenness in liquid composition is liable to be generated, and hence the mixing method involving using a trifurcate tube described above in ii) is more preferably used in order to more reliably prevent such local unevenness in liquid composition. In addition, the phrase "the flow amount is made constant" encompasses not only the case where the flow amount is completely constant, but also the case where the flow amount varies along with liquid delivery by a hitherto known liquid delivery method, for example, the case where the flow amount slightly varies owing to an oscillation (pulse) generated during liquid delivery using a pump.

When the trifurcate tube is used, it is appropriate to continuously supply the polycondensation reaction liquid in a constant flow amount from the inlet side of a first flow passage of three flow passages trifurcated from a connecting portion toward the connecting portion side, and to continuously supply the aqueous solution in a constant flow amount from the inlet side of a second flow passage of the three flow passages toward the connecting portion side. With this, the polycondensation reaction liquid and the aqueous solution are always mixed at a constant ratio in the connecting portion, and hence the composition of the mixed liquid immediately after the mixing of the polycondensation reaction liquid with the aqueous solution in the connecting portion is always kept constant. Then, the mixed liquid flowing from the connecting portion to the outlet side of a third flow passage is collected from the outlet side of the third flow passage as the spherical polyalkylsilsesquioxane fine particle dispersion liquid. When the trifurcate tube is used, the polycondensation reaction liquid and the aqueous solution are mixed simultaneously with their collision in the connecting portion. Such collisional mixing may be appropriately performed also by using an apparatus other than the trifurcate tube, for example, an apparatus including trifurcated groove-like flow passages formed in a plate surface.

The volume ratio Vr of the total volume amount of the aqueous solution to the total volume amount of the polycondensation reaction liquid to be used in the second mixing method (total volume amount of aqueous solution/total volume amount of polycondensation reaction liquid) is preferably from 0.19 times to 3.2 times, preferably from 0.32 times to 1.6 times. In addition, the mass ratio Mr of the total mass of the aqueous solution to the total mass of the polycondensation reaction liquid to be used in the second mixing method (total mass of aqueous solution/total mass of polycondensation reaction liquid) is preferably from 0.25 times to 4.0 times, preferably from 0.40 times to 2.0 times.

In addition, of the above-mentioned second mixing methods, a mixing method involving using a tubular reactor including a trifurcate tube, such as a Y-shaped tube or a T-shaped tube, is preferred. In this case, from the viewpoint of, for example, the stability of the flow amount, a Y-shaped tubular reactor including a constricted portion arranged in each of flow passages (first flow passage and second flow passage) for supplying liquids to the connecting portion as disclosed in JP 2003-221222 A is preferably used.

Figure 2:
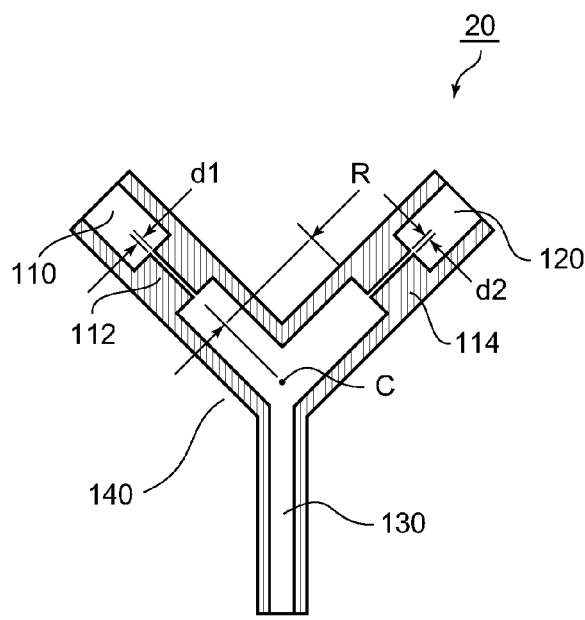
FIG. 2 is an enlarged cross-sectional view for illustrating an example of the cross-sectional structure of a tubular reactor illustrated in FIG. 1.

FIG. 1 is a general schematic view for illustrating an example of a reaction apparatus to be used in the method of manufacturing the hydrophobized spherical polyalkylsilsesquioxane fine particle according to this embodiment, and FIG. 2 is an enlarged cross-sectional view for illustrating an example of the cross-sectional structure of a tubular reactor illustrated in FIG. 1. A reaction apparatus 10 illustrated in FIG. 1 includes: a Y-shaped trifurcate tubular reactor 20 including a first flow passage 110, a second flow passage 120, a third flow passage 130, and a connecting portion 140 at which ends of the three flow passages 110, 120, 130 on one side are connected to each other; a first pump 30 connected to the inlet side of the first flow passage 110 (end side opposite to the connecting portion 140); a second pump 32 connected to the inlet side of the second flow passage 120 (end side opposite to the connecting portion 140); a first raw material tank 40 connected to the first pump 30; a second raw material tank 42 connected to the second pump 32; and a collection tank 50 connected to the outlet side of the third flow passage 130 (end side opposite to the connecting portion 140).

When the third step is performed using the reaction apparatus 10 illustrated in FIG. 1, for example, the polycondensation reaction liquid stored in the first raw material tank 40 is continuously supplied via the first pump 30 in a constant flow amount to the first flow passage 110, and the aqueous solution stored in the second raw material tank 42 is continuously supplied via the second pump 32 in a constant flow amount to the second flow passage 120. With this, in the connecting portion 140, the polycondensation reaction liquid and the aqueous solution are mixed simultaneously with their collision. Then, the mixed liquid of the polycondensation reaction liquid and the aqueous solution is collected from the connecting portion 140 side via the third flow passage 130 into the collection tank 50 as the spherical polyalkylsilsesquioxane fine particle dispersion liquid. The mixed liquid discharged from the third flow passage 130 may be further stirred and mixed by being passed through a static mixer or the like. In this case, the flow rate of each of the polycondensation reaction liquid and the aqueous solution in the tubular reactor can be set to be higher, and hence higher productivity can be obtained.

The liquid delivery of the polycondensation reaction liquid and the aqueous solution to the trifurcate tubular reactor 20 may adopt any of known liquid delivery techniques other than the pumps 30, 32, such as pressure feed, without any limitation. Of those, pressure feed, which can subject the polycondensation reaction liquid and the aqueous solution to collisional mixing continuously and homogeneously, is preferred. In addition, when the pumps 30, 32 are used, multiple reciprocating pumps, which generate no pulsation, or pumps with damping apparatus, such as accumulators, are suitably used.

In addition, when the trifurcate tubular reactor 20 as exemplified in FIG. 1 is used, the flow rate of each of the polycondensation reaction liquid and the aqueous solution in the vicinity of the connecting portion 140 is set to preferably 1.5 m/sec or more, more preferably 2.5 m/sec or more, still more preferably 3 m/sec or more. In this case, the flow rate in the vicinity of the connecting portion 140 more precisely means a flow rate on the outlet side (connecting portion 140 side) of the constricted portion 112 in the first flow passage 110, and means a flow rate on the outlet side (connecting portion 140 side) of the constricted portion 114 in the second flow passage 120. When the flow rate is less than 1.5 m/sec, the collisional mixing of the polycondensation reaction liquid with the aqueous solution is liable to be insufficient, and the particle diameter of the spherical polyalkylsilsesquioxane fine particle to be obtained may vary to widen the particle size distribution. The upper limit of the flow rate is preferably 20 m/sec or less, more preferably 15 m/sec or less. When the flow rate is more than 20 m/sec, the mixing of the polycondensation reaction liquid with the aqueous solution may be insufficient, to thereby widen the particle size distribution.

In addition, the ratio of the flow rate of the aqueous solution to the flow rate of the polycondensation reaction liquid (flow rate ratio) is preferably from 0.25 to 4, more preferably from 0.4 to 2. When the flow rate ratio is less than 0.25, the particle diameter tends to increase, and the particle size distribution is also widened in some cases. In addition, when the flow rate ratio is more than 4, the effect tends to reach a plateau, and the use of a large amount of the aqueous solution results in poor economic efficiency.

In addition, in the trifurcate tubular reactor 20 illustrated in FIG. 1, an angle formed between the central axis of the first flow passage 110 and the central axis of the second flow passage 120 is preferably from 30 degrees to 180 degrees, more preferably from 45 degrees to 150 degrees, still more preferably from 60 degrees to 120 degrees. When the angle is about 180 degrees, the trifurcate tubular reactor 20 has a T-shape instead of a Y-shape.

In addition, from the viewpoint of making it easier to obtain a spherical polyalkylsilsesquioxane fine particle having a desired particle diameter and particle size distribution, it is preferred that, as illustrated in FIG. 2, the constricted portions 112, 114 each capable of adjusting a flow rate be arranged in the first flow passage 110 and in the second flow passage 120, respectively. In this case, a distance R from the flow outlet side (connecting portion 140 side) of the constricted portions 112, 114 to a central point C of the connecting portion 140 is preferably from 1 times to 25 times, more preferably from 1 times to 9 times as large as a constricted portion diameter d1 of the constricted portion 112 or a constricted portion diameter d2 of the constricted portion 114. In addition, the distance R from the flow outlet side (connecting portion 140 side) of the constricted portion 112 to the central point C, and the distance R from the flow outlet side (connecting portion 140 side) of the constricted portion 114 to the central point C are preferably equal to each other.

Through the above-mentioned process, a spherical polyalkylsilsesquioxane fine particle dispersion liquid containing a spherical polyalkylsilsesquioxane fine particle having a median diameter of from 0.05 µm to 0.3 µm is obtained. In the method of manufacturing the hydrophobized spherical polyalkylsilsesquioxane fine particle according to this embodiment, as the fourth step, a hydrophobizing agent is blended in the spherical polyalkylsilsesquioxane fine particle dispersion liquid to subject the surface of the spherical polyalkylsilsesquioxane fine particle to hydrophobizing treatment. Even when an attempt is made to collect the spherical polyalkylsilsesquioxane fine particle from the spherical polyalkylsilsesquioxane fine particle dispersion liquid obtained in the third step and to subject the collected particle to hydrophobizing treatment, as described above, in a separating step or drying step of the spherical polyalkylsilsesquioxane fine particles, in general, the particles are firmly aggregated together to generate an aggregate mass, and even when the resultant is hydrophobized, it has been difficult to obtain a particle having a narrow width of a particle size distribution and being excellent in disintegrability. In addition, as exemplified in Patent Literatures 1 and 2, in general, a particle having a small particle diameter obtained by a sol-gel method is highly dispersed as a fine primary particle. Accordingly, it is difficult to collect the particle by a filtration method, and a centrifugation method, a solvent evaporation method, or the like is adopted. However, the particles collected by such method tend to be firmly aggregated together. Further, the particles each having a small particle diameter are liable to be aggregated when dried, and the generation of an aggregate mass which cannot be easily disintegrated due to firm aggregation of the particles together cannot be avoided. Even when such aggregate mass is subjected to disintegration treatment with a mortar or the like, the aggregate mass is difficult to completely loosen into primary particles. In contrast, when the hydrophobizing agent is directly blended in the spherical polyalkylsilsesquioxane fine particle dispersion liquid to perform hydrophobizing treatment as described above, if the hydrophobized spherical polyalkylsilsesquioxane fine particles to be obtained form an aggregate mass, its disintegrability is excellent.

An organic silicon compound is generally used as the hydrophobizing agent to be used for the hydrophobizing treatment. Examples of such organic silicon compound may include, but not particularly limited to: alkylsilazane-based compounds, such as hexamethyldisilazane; alkylalkoxysilane-based compounds, such as dimethyldimethoxysilane, diethyldiethoxysilane, trimethylmethoxysilane, methyltrimethoxysilane, and butyltrimethoxysilane; chlorosilane-based compounds, such as dimethyldichlorosilane and trimethylchlorosilane; a silicone oil; and a silicone varnish. One kind of those hydrophobing agents may be used alone, or two or more kinds thereof may be used as a mixture, and any of those hydrophobing agents may be diluted with, for example, an organic solvent, before use.

Of the above-mentioned hydrophobizing agents, at least one kind selected from the group consisting of alkylsilazane-based compounds and alkylalkoxysilane-based compounds is preferably used because of good reactivity, the ease of handling, and the like, and hexamethyldisilazane is more preferably used because of good fluidity of the hydrophobized spherical polyalkylsilsesquioxane fine particle to be obtained.

The usage amount of the hydrophobizing agent is not particularly limited. However, an excessively small usage amount may cause the hydrophobizing treatment to be insufficient, and an excessively large usage amount complicates posttreatment. Accordingly, the usage amount is set to preferably from 0.01 part by mass to 300 parts by mass, more preferably from 10 parts by mass to 200 parts by mass with respect to 100 parts by mass of the spherical polyalkylsilsesquioxane fine particle to be subjected to the hydrophobizing treatment.

A method of blending the hydrophobizing agent in the spherical polyalkylsilsesquioxane fine particle dispersion liquid is not particularly limited. When the hydrophobizing agent is liquid under ordinary temperature and ordinary pressure, the hydrophobizing agent may be dropped into the spherical polyalkylsilsesquioxane fine particle dispersion liquid, or may be showered thereinto. Dropping is preferred because of the convenience of operation.

A treatment temperature is not particularly limited, and may be determined in consideration of the reactivity of the hydrophobizing agent to be used. The treatment temperature may be set to, for example, from 0° C. to 100° C. In addition, a treatment time may be set to, for example, from 0.1 hour to 72 hours. However, from the viewpoint of shortening the treatment time, the treatment temperature is preferably high, and specifically, the treatment temperature is preferably set to a temperature around the boiling point of the organic solvent used in the second step. For example, when the organic solvent used in the second step is methanol (boiling point: 64.7° C.), the treatment temperature may be set to about 70±5° C. In this case, whereas a treatment time of from about 48 hours to about 72 hours is generally required when the treatment temperature is set to ordinary temperature, the treatment time is easily set to 10 hours or less, or even 5 hours or less when the treatment temperature is set to a temperature around the boiling point of the organic solvent used in the second step. In addition, the disintegration strength of the hydrophobized spherical polyalkylsilsesquioxane fine particle to be obtained is also easily reduced.

The hydrophobized spherical polyalkylsilsesquioxane fine particle to be obtained by subjecting the surface of the spherical polyalkylsilsesquioxane fine particle to the hydrophobizing treatment with the hydrophobizing agent generally floats in the upper layer portion of the spherical polyalkylsilsesquioxane fine particle dispersion liquid (such liquid is hereinafter referred to as "powder floating liquid"). As a method of collecting the hydrophobized spherical polyalkylsilsesquioxane fine particle from the powder floating liquid, a known method may be used without any particular limitation. For example, the floating powder may be scooped up or a filtration method may be adopted. The filtration method is preferred because of the convenience of operation. The filtration method is not particularly limited, and a known apparatus for, for example, filtration under reduced pressure, centrifugal filtration, or pressure filtration may be selected. Filter paper, a filter, a filter fabric, or the like to be used in the filtration is not particularly limited as long as such product is industrially available, and may be appropriately selected depending on the methods to be used.

The collected powder of the hydrophobized spherical polyalkylsilsesquioxane fine particle may be used as it is, but the powder is preferably dried before use in order to obtain a hydrophobized spherical polyalkylsilsesquioxane fine particle having a low content of an impurity. A method of drying the powder is not particularly limited, and may be selected from known methods, such as air blast drying and drying under reduced pressure. Of those, in particular, drying under reduced pressure is more preferred because dry powder which is easy to loosen is obtained. A drying temperature is not particularly limited as long as a functional group, such as an alkyl group, contained in the hydrophobized spherical polyalkylsilsesquioxane fine particle is not decomposed at the temperature, and may be appropriately set to a suitable temperature from the range of from 65° C. to 350° C., in particular, the range of from 80° C. to 250° C. In addition, a drying time is not particularly limited, but when the drying time is set to from 2 hours to 48 hours, a sufficiently dried hydrophobized spherical polyalkylsilsesquioxane fine particle can be obtained.

The hydrophobized spherical polyalkylsilsesquioxane fine particle obtained by the above-mentioned method is excellent in disintegrability as described above. The disintegrability of the hydrophobized spherical polyalkylsilsesquioxane fine particle may be evaluated by a crushing strength measurement method. Specifically, powder of hydrophobized spherical polyalkylsilsesquioxane fine particles vacuum-dried at 100° C. for 15 hours is sifted with a sieve having an opening of 1.4 mm and then sifted with a sieve having an opening of 0.71 mm, and powder of hydrophobized spherical polyalkylsilsesquioxane fine particles remaining on the sieve having an opening of 0.71 mm is used for measurement. The powder is put on an even balance, and a load is applied with a spatula made of a metal. The load at the time when the powder is disintegrated is recorded, and the disintegration strength is calculated by the following expression (3).

$$\text{Disintegration strength (N)} = \text{load (g)} \times 9.80665 \times 10^{-3} \quad \text{Expression (3)}$$

The measurement is repeated 60 times, and the average value thereof is defined as the disintegration strength (average disintegration strength). A smaller value for the disintegration strength means that the powder is easier to loosen. The disintegration strength (average disintegration strength) of the hydrophobized spherical polyalkylsilsesquioxane fine particle according to this embodiment is preferably 0.20 N or less, more preferably from 0.005 N to 0.150 N, still more preferably from 0.005 N to 0.100 N.

That is, hydrophobized spherical polyalkylsilsesquioxane fine particles having a disintegration strength within the above-mentioned range means that their aggregate mass is easily disintegrated into primary particles when added to a resin or the like and kneaded through the application of a shear force with such kneader or disperser. Meanwhile, a disintegration strength of more than 0.20 N means that an aggregate mass in which hydrophobized spherical polyalkylsilsesquioxane fine particles are firmly aggregated together is formed. Such aggregate mass is difficult to completely loosen into primary particles even when subjected to disintegration treatment with a mortar or the like, and disintegration treatment is separately needed when the aggregate mass is to be used as primary particles. When hydrophobized spherical polyalkylsilsesquioxane fine particles containing the aggregate mass are used as various additives, dispersibility in a dispersion medium, such as a resin or a solvent, is reduced. In addition, in the case where the dispersion medium is a resin, the aggregate mass may cause a reduction in fluidity. In addition, in the case of using the hydrophobized spherical polyalkylsilsesquioxane fine particles containing the aggregate mass as an external additive for toner, as in the case where the median diameter is more than 0.3 µm, there is a tendency that toner particle surfaces are not easily covered by the external additive particles, and even when the toner particle surfaces are covered, the external additive particles are liable to be detached from the toner particle surfaces, and the external additive particles detached from the toner particle surfaces may cause damage to a photoreceptor or a defect in image quality.

The hydrophobized spherical polyalkylsilsesquioxane fine particle according to this embodiment may be suitably used in various applications, such as additives for modifying paints, plastics, rubbers, cosmetics, and paper, and an abrasive in a semiconductor fabrication process. In particular, the hydrophobized spherical polyalkylsilsesquioxane fine particle according to this embodiment is best suited for use as an external additive for toner. The performance of the hydrophobized spherical polyalkylsilsesquioxane fine particle according to this embodiment as an external additive for toner may be evaluated on the basis of the coverage of the hydrophobized spherical polyalkylsilsesquioxane fine particle over the toner, and a charging stability index indicating the influence of a particle addition amount, and an environmental stability index indicating the influence of temperature and humidity. Any such evaluation may be performed using a simulated toner as in evaluation in each of Examples to be described later.

In addition, a toner according to one embodiment of the present invention includes toner particles and the hydrophobized spherical polyalkylsilsesquioxane fine particles according to the above-mentioned embodiment. In this case, the hydrophobized spherical polyalkylsilsesquioxane fine particles according to the above-mentioned embodiment are externally added as an external additive for toner to the toner particles. Except that the hydrophobized spherical polyalkylsilsesquioxane fine particles according to the above-mentioned embodiment are used as the external additive for toner, the toner according to this embodiment is not particularly limited in terms of any other material and its manufacturing method, and a known material or manufacturing method may be appropriately utilized. In addition, as the external additive for toner, particles other than the hydrophobized spherical polyalkylsilsesquioxane fine particles according to the above-mentioned embodiment may be contained in the toner according to this embodiment.

In the toner according to this embodiment, the addition amount of the hydrophobized spherical polyalkylsilsesquioxane fine particles according to the above-mentioned embodiment is not particularly limited as long as the addition amount allows desired characteristic-improving effects to be obtained. The addition amount is preferably from 0.1 mass % to 5.0 mass %, more preferably from 0.2 mass % to 4.0 mass %. When the content is less than 0.1 mass %, the transferability and durability-improving effects and the chargeability-stabilizing effect based on the addition of the hydrophobized spherical polyalkylsilsesquioxane fine particles according to the above-mentioned embodiment may not be sufficiently obtained. In addition, when the content is more than 5.0 mass %, the hydrophobized spherical polyalkylsilsesquioxane fine particles are liable to be detached from toner particle surfaces and an aggregate of the hydrophobized spherical polyalkylsilsesquioxane fine particles is liable to be generated, possibly resulting in problems in a printed image and a cleaning property.

In addition, each of the toner particles contains at least a thermoplastic resin and a coloring material, such as a pigment, and further contains, as necessary, a charge control agent, a release agent, or the like. As the toner particles, any hitherto known ones may be utilized without any limitation, and for example, any of a magnetic or non-magnetic one-component toner and two-component toner may be adopted. In addition, any of a negatively chargeable toner and a positively chargeable toner may be adopted, and any of a monochromatic toner and a color toner may be adopted.

In the manufacture of the toner according to this embodiment, the hydrophobized spherical polyalkylsilsesquioxane fine particles according to the above-mentioned embodiment may be used alone as an external additive for toner, or may be used in combination with another additive depending on purposes. For example, the hydrophobized spherical polyalkylsilsesquioxane fine particles according to the above-mentioned embodiment may be used in combination with, for example, other surface-treated dry silica fine particles, or surface-treated titanium oxide fine particles, alumina fine particles, or cerium oxide fine particles.

EXAMPLES

The present invention is more specifically described below by way of Examples and Comparative Examples. However, the present invention is not limited thereto. Various physical properties of produced samples were evaluated by the following methods.

(1) Measurement of Median Diameter and Particle Size Distribution

The median diameter and particle size distribution of particles were measured by the following procedure. First, 0.1 g of dried hydrophobized spherical polyalkylsilsesquioxane fine particles were loaded into a container made of glass having an inner diameter of 4 cm and a height of 11 cm, and 50 g of 2-propanol was added thereto to provide a solution. Next, 4.5 cm of a probe (inner diameter of end: 7 mm) of an ultrasonic disperser from its end was immersed in the solution, and dispersion was performed by ultrasonic dispersion at an output of 20 W for 15 minutes to provide a dispersion liquid. Then, the dispersion liquid was used to measure a median diameter and a particle size distribution with a centrifugal sedimentation particle size distribution measurement apparatus DC24000 manufactured by CPS Instruments, Inc. The number of rotations of its disc was set to 24,000 rpm, and the true density of polyalkylsilsesquioxane was set to 1.3 g/cm$^3$. Prior to the measurement, the apparatus was calibrated using polyvinyl chloride particles having an average particle diameter of 0.476 μm. On the basis of the measured particle size distribution of the particles, a cumulative distribution was drawn for the masses of individual particles from a small particle diameter side, and a value obtained by the following expression (4), i.e., obtained by dividing a particle diameter D90 at a cumulative frequency of 90% by a particle diameter D10 at a cumulative frequency of 10% was defined as a particle size distribution index.

Particle size distribution index=(D90/D10)    Expression (4)

(2) Measurement of Degree of Hydrophobicity

A degree of hydrophobicity was measured by a methanol titration method. First, in a mixed liquid obtained by adding 0.2 g of hydrophobized spherical polyalkylsilsesquioxane fine particles into 50 ml of water, until their whole amount was wetted, methanol was dropped from a burette to the stirred mixed liquid. The value for the percentage of methanol with respect to the total amount of the mixed liquid and dropped methanol at the time of the completion of the dropping was defined as the degree of hydrophobicity. A higher value for the degree of hydrophobicity indicates higher hydrophobicity, and a lower value therefor indicates higher hydrophilicity.

(3) Measurement of Floating Ratio

The floating ratio of hydrophobized spherical polyalkylsilsesquioxane fine particles in 50 vol % methanol water was measured by the following procedure. First, 100 ml of 50 vol % methanol water and 0.5 g of the hydrophobized spherical polyalkylsilsesquioxane fine particles were loaded into a 110 ml screw-capped vial, mixed with a shaker for 30 minutes, and left at rest overnight. A slurry containing wetted and settled hydrophobized spherical polyalkylsilsesquioxane fine particles was removed with a dropper, and powder and liquid floating on the solution were dried at 70° C. for 2 hours and at 120° C. for 15 hours. Residual fine particles remaining in the screw-capped vial were weighed, and the percentage of the mass (g) of the residual fine particles with respect to the loading amount (0.5 g) was defined as the floating ratio.

(4) Measurement of Saturated Water Content

A saturated water content was measured by the following method. 10 g of hydrophobized spherical polyalkylsilsesquioxane fine particles were dried at 120° C. for 24 hours, and then cooled in a desiccator containing silica gel. Then, the fine particles cooled in the desiccator were left at rest under a 25° C. and 50% RH environment for 48 hours, and the mass (Dwet) of the fine particles was weighed. The fine particles after the weighing were dried again at 120° C. for 24 hours, and the mass (Ddry) of the fine particles was weighed. A value calculated by the following expression (5) on the basis of a mass change between the masses before and after moisture conditioning was defined as a saturated water content.

Saturated water content=((Dwet−Ddry)/Ddry)×100    Expression (5)

(5) Average Circularity

The circularity of primary particles was measured as follows: image data obtained through observation by FE-SEM in a field of view at 100,000× was analyzed with image analysis software to determine the circumferences and projected areas of the particles, and calculation was performed by the expression (2) described above. Next, a value at a cumulative frequency of 50% of the resultant circularities of 100 primary particles was determined as an average circularity.

(6) Measurement of Disintegration Strength

The Disintegration Strength of hydrophobized spherical polyalkylsilsesquioxane fine particles was calculated by the following method. First, powder of hydrophobized spherical polyalkylsilsesquioxane fine particles vacuum-dried at 100° C. for 15 hours was sifted with a sieve having an opening of 1.4 mm and then sifted with a sieve having an opening of 0.71 mm, and powder remaining on the sieve having an opening of 0.71 mm was used for measurement. The powder were put on an even balance, and a load was applied with a spatula made of a metal. The load at the time when the powder was loosened was recorded, and a disintegration strength was calculated by the expression (3) described above.

(7) Evaluation Methods for Toner Coverage, Charging Stability Index, and Environmental Stability Index 20 g of styrene-acrylic resin particles having a median diameter of 6.1 μm serving as simulated toner particles, and 0.2 g (1 mass %) or 0.8 g (4 mass %) of hydrophobized spherical polyalkylsilsesquioxane fine particles serving as external additive particles were loaded into a 100 ml container made of polyethylene, and mixed with a shaker for 60 minutes. Thus, a simulated toner (1 mass %) and a simulated toner (4 mass %) were obtained.

(Toner Coverage)

For the coverage (toner coverage) of the external additive particles covering toner particle surfaces, the simulated toner (1 mass %) was observed with a FE-SEM at 10,000×, and on the basis of the resultant image data, the projected area (S1) of the styrene-acrylic resin particles and the projected area (S2) of the external additive particles covering the surfaces of the styrene-acrylic resin particles were determined with image analysis software, and the average value for the coverage of toner particle surface was calculated by the following expression (6). A higher toner coverage is more effective for improving the transferability and durability of the toner.

Coverage of toner particle surface (%)=$S2/S1 \times 100$    Expression (6)

(Charging Stability Index and Environmental Stability Index)

A charging stability index and an environmental stability index were determined by the following procedure. First, 1.0 g each of the simulated toner (1 mass %) was weighed out and loaded into three 50 ml screw-capped vials together with 99 g of a ferrite carrier manufactured by Powdertech Co., Ltd., and the three samples thus prepared were subjected to moisture conditioning overnight under the conditions of 25° C./50% RH, 30° C./85% RH (high-temperature and high-humidity conditions), and 10° C./15% RH (low-temperature and low-humidity conditions), respectively, and the charge amount of each of the samples was measured with a blow-off charge amount measurement apparatus "TB-203" manufactured by Kyocera Chemical Corporation.

Similarly, 1.0 g of the simulated toner (4 mass %) was weighed out and loaded into one 50 ml screw-capped vial together with 99 g of a ferrite carrier manufactured by Powdertech Co., Ltd., and the sample thus prepared was subjected to moisture conditioning overnight under the conditions of 25° C./50% RH, and the charge amount of the sample was measured with a blow-off charge amount measurement apparatus "TB-203" manufactured by Kyocera Chemical Corporation.

In this case, the charging stability index was calculated as the percentage of a value obtained by dividing the saturated charge amount (NN4) of the simulated toner (4 mass %) subjected to moisture conditioning overnight under the conditions of 25° C./50% RH by the saturated charge amount (NN1) of the simulated toner (1 mass %) also subjected to moisture conditioning overnight under the conditions of 25° C./50% RH (see the following expression (7)).

Charging stability index=$NN4/NN1 \times 100$    Expression (7)

A higher value for the charging stability index means that the charge amount of the toner is less liable to be influenced by the addition amount of the external additive particles, and a variation among the charge amounts of individual toner particles is suppressed to enable the charge amount distribution to be controlled to a relatively narrower one, with the result that image formation at a higher definition can be achieved. The charging stability index of such simulated toner is preferably 80% or more, more preferably 90% or more.

In addition, the environmental stability index was calculated by the following expression (8) by using the saturated charge amount (LL1) of the simulated toner (1 mass %) subjected to moisture conditioning overnight under the low-temperature and low-humidity conditions, and the saturated charge amount (HH1) of the simulated toner (1 mass %) subjected to moisture conditioning overnight under the high-temperature and high-humidity conditions.

Environmental stability index=$(LL1-HH1)/(LL1+HH1) \times 2$    Expression (8)

A smaller value for the environmental stability index means a smaller change in charge amount due to environmental changes, such as changes in humidity and temperature. The environmental stability index of such simulated toner is preferably 0.65 or less, more preferably 0.60 or less.

(8) Solid Content Concentration 10 g of a spherical polyalkylsilsesquioxane fine particle dispersion liquid obtained during the process of producing hydrophobized spherical polyalkylsilsesquioxane fine particles of each of Examples and Comparative Examples was loaded into a weighing bottle, and predried at 70° C. for 24 hours and then vacuum-dried at 100° C. for 24 hours. The dry weight of the solid content (spherical polyalkylsilsesquioxane fine particles) remaining in the weighing bottle was measured. In this case, the solid content concentration was determined on the basis of the following expression (9).

Solid content concentration (%)=(dry weight of solid content/10 g)×100    Expression (9)

Example 1-1

First Step

A 200 ml recovery flask was loaded with 54.0 g of water and 0.01 g of acetic acid serving as a catalyst, and the mixture was stirred at 30° C. 68.0 g of methyltrimethoxysilane was added thereto, and the mixture was stirred for 1 hour to provide 122.0 g of a raw material solution. In this case, the amount of methanol generated by the hydrolysis reaction of methyltrimethoxysilane is 48.1 g. The alcohol amount is a theoretically calculated value on the assumption of 100% hydrolysis, and the same applies to each of the following Examples and Comparative Examples.

Second Step

A 1,000 ml recovery flask was loaded with 2.8 g of 25% ammonia water, 128.0 g of water, and 383.0 g of methanol, and the mixture was stirred at 30° C. to prepare an alkaline aqueous medium. To the alkaline aqueous medium, 122.0 g of the raw material solution obtained in the first step was dropped over 1 minute. The mixed liquid after the dropping of the raw material solution was directly stirred for 25 minutes to allow the polycondensation reaction of the fine particle precursor to proceed, to thereby provide 635.8 g of a polycondensation reaction liquid.

Third Step

A 5,000 ml recovery flask was loaded with 2,500 g of water serving as an aqueous solution, and 635.8 g of the polycondensation reaction liquid obtained in the second step was dropped over 1 minute to the stirred water at 25° C. The polycondensation reaction liquid immediately became cloudy when mixed with water, to thereby provide 3,136 g of a dispersion liquid containing spherical polymethylsilsesquioxane fine particles. The content of the fine particles (solid content concentration) in the resultant dispersion liquid was 1.1 mass %.

Fourth Step

To the spherical polymethylsilsesquioxane fine particle dispersion liquid obtained in the third step, 30.3 g of hexamethyldisilazane was added as a hydrophobizing agent, and the mixture was stirred at 25° C. for 48 hours. As a result, a powder floating liquid containing powder of hydrophobized spherical polymethylsilsesquioxane fine particles floating in the upper layer portion of the liquid was obtained. The powder floating liquid was left at rest for 5 minutes, and powder which had floated up was collected by suction filtration and dried under reduced pressure at 100° C. for 24 hours to provide 31.4 g of white dry powder of hydrophobized spherical polymethylsilsesquioxane fine particles.

Example 1-2

The first step to the fourth step were performed in the same manner as in Example 1-1 except that the amount of methyltrimethoxysilane to be used in the first step was changed to 136.0 g. Thus, dry powder of hydrophobized spherical polymethylsilsesquioxane fine particles was obtained. In this case, the amount of methanol generated by the hydrolysis reaction of methyltrimethoxysilane is 96.1 g.

The fine particle amount (solid content concentration) in the dispersion liquid containing spherical polymethylsilsesquioxane fine particles obtained in the third step was 1.4 mass %.

Example 1-3

The first step to the fourth step were performed in the same manner as in Example 1-1 except that the amount of methyltrimethoxysilane to be used in the first step was changed to 34.0 g. Thus, dry powder of hydrophobized spherical polymethylsilsesquioxane fine particles was obtained. In this case, the amount of methanol generated by the hydrolysis reaction of methyltrimethoxysilane is 24.0 g.

The fine particle amount (solid content concentration) in the dispersion liquid containing spherical polymethylsilsesquioxane fine particles obtained in the third step was 0.7 mass %.

Example 1-4

The first step to the fourth step were performed in the same manner as in Example 1-1 except that the amounts of water and methanol to be used in the second step were changed to 100 g and 335 g, respectively, and in the third step, 559.8 g of the polycondensation reaction liquid obtained in the second step was dropped to 2,100 g of water. In the first step, the amount of methanol generated by the hydrolysis reaction of methyltrimethoxysilane is 48.1 g. Thus, dry powder of hydrophobized spherical polymethylsilsesquioxane fine particles was obtained.

The fine particle amount (solid content concentration) in the dispersion liquid containing spherical polymethylsilsesquioxane fine particles obtained in the third step was 1.3 mass %.

Example 1-5

The first step to the fourth step were performed in the same manner as in Example 1-4 except that, in the third step, the polycondensation reaction liquid obtained in the second step was dropped to 1,680 g of water. Thus, dry powder of hydrophobized spherical polymethylsilsesquioxane fine particles was obtained.

The fine particle amount (solid content concentration) in the dispersion liquid containing spherical polymethylsilsesquioxane fine particles obtained in the third step was 1.5 mass %.

Example 1-6

The first step to the fourth step were performed in the same manner as in Example 1-4 except that, in the third step, the polycondensation reaction liquid obtained in the second step was dropped to 1,120 g of water. Thus, dry powder of hydrophobized spherical polymethylsilsesquioxane fine particles was obtained.

The fine particle amount (solid content concentration) in the dispersion liquid containing spherical polymethylsilsesquioxane fine particles obtained in the third step was 2.0 mass %.

Example 1-7

The first step to the fourth step were performed in the same manner as in Example 1-4 except that the reaction temperature and the reaction time of the first step were changed to 10° C. and 5 hours, respectively, and the reaction time of the second step was changed to 15 minutes. Thus, dry powder of hydrophobized spherical polymethylsilsesquioxane fine particles was obtained.

Example 1-8

The first step to the fourth step were performed in the same manner as in Example 1-4 except that the reaction temperature and the reaction time of the first step were changed to 50° C. and 0.5 hour, respectively, and the reaction time of the second step was changed to 50 minutes. Thus, dry powder of hydrophobized spherical polymethylsilsesquioxane fine particles was obtained.

Example 1-9

The first step to the fourth step were performed in the same manner as in Example 1-4 except that the amount of 25% ammonia water to be used in the second step was changed to 0.28 g and the reaction time was changed to 90 minutes, and in the third step, 557.3 g of the polycondensation reaction liquid obtained in the second step was dropped to 2,100 g of stirred water at 70° C. Thus, dry powder of hydrophobized spherical polymethylsilsesquioxane fine particles was obtained.

Example 1-10

The first step to the fourth step were performed in the same manner as in Example 1-4 except that the amounts of water and methanol to be used in the second step were changed to 200 g and 240 g, respectively, and the reaction temperature and the reaction time were changed to 10° C. and 60 minutes, respectively. Thus, dry powder of hydrophobized spherical polymethylsilsesquioxane fine particles was obtained.

Example 1-11

The first step to the fourth step were performed in the same manner as in Example 1-4 except that the amounts of water and methanol to be used in the second step were changed to 50 g and 390 g, respectively, and the reaction temperature and the reaction time were changed to 50° C. and 15 minutes, respectively. Thus, dry powder of hydrophobized spherical polymethylsilsesquioxane fine particles was obtained.

Example 1-12

The first step to the fourth step were performed in the same manner as in Example 1-4 except that the reaction time of the fourth step was changed to 15 hours. Thus, dry powder of hydrophobized spherical polymethylsilsesquioxane fine particles was obtained.

Example 1-13

The first step to the fourth step were performed in the same manner as in Example 1-4 except that the reaction time of the fourth step was changed to 24 hours. Thus, dry powder of hydrophobized spherical polymethylsilsesquioxane fine particles was obtained.

Example 1-14

The first step to the fourth step were performed in the same manner as in Example 1-4 except that the reaction time of the fourth step was changed to 36 hours. Thus, dry powder of hydrophobized spherical polymethylsilsesquioxane fine particles was obtained.

Example 1-15

The first step to the fourth step were performed in the same manner as in Example 1-4 except that, in the third step, the polycondensation reaction liquid was dropped to stirred water at 70° C., and in the fourth step, the reaction temperature and the reaction time were changed to 70° C. and 5 hours, respectively. Thus, dry powder of hydrophobized spherical polymethylsilsesquioxane fine particles was obtained.

Example 1-16

The first step to the fourth step were performed in the same manner as in Example 1-4 except that the amounts of water and methanol to be used in the second step were changed to 28 g and 168 g, respectively, in the third step, 320.8 g of the polycondensation reaction liquid obtained in the second step was dropped to 1,300 g of water, and in the fourth step, the reaction temperature and the reaction time were changed to 70° C. and 5 hours, respectively. Thus, dry powder of hydrophobized spherical polymethylsilsesquioxane fine particles was obtained.

The fine particle amount (solid content concentration) in the dispersion liquid containing spherical polymethylsilsesquioxane fine particles obtained in the third step was 2.1 mass %.

Example 1-17

The first step to the fourth step were performed in the same manner as in Example 1-4 except that the amounts of water and methanol to be used in the second step were changed to 20 g and 85 g, respectively, in the third step, 227.3 g of the polycondensation reaction liquid obtained in the second step was dropped to 880 g of water, and in the fourth step, the reaction temperature and the reaction time were changed to 70° C. and 5 hours, respectively. Thus, dry powder of hydrophobized spherical polymethylsilsesquioxane fine particles was obtained.

The fine particle amount (solid content concentration) in the dispersion liquid containing spherical polymethylsilsesquioxane fine particles obtained in the third step was 3.0 mass %.

Example 1-18

First Step

A 200 ml recovery flask was loaded with 47.1 g of water and 0.087 g of acetic acid serving as a catalyst, and the mixture was stirred at 30° C. To the mixture, 74.8 g of methyltriethoxysilane was added, and the whole was stirred for 90 minutes to provide 122.0 g of a raw material solution. In this case, the amount of ethanol to be generated by the hydrolysis reaction of methyltriethoxysilane is 58.0 g.

Second Step

A 1,000 ml recovery flask was loaded with 22.5 g of 25% ammonia water, 80 g of water, and 260 g of methanol, and the mixture was stirred at 30° C. to prepare an alkaline aqueous medium. To the alkaline aqueous medium, 122 g of the raw material solution obtained in the first step was dropped over 1 minute.

The mixed liquid after the dropping of the raw material solution was directly stirred for 20 minutes to allow the polycondensation reaction of the fine particle precursor to proceed, to thereby provide 484.5 g of a polycondensation reaction liquid.

Third Step

A 5,000 ml recovery flask was loaded with 1,700 g of water serving as an aqueous solution, and to the stirred water at 25° C., 484.5 g of the polycondensation reaction liquid obtained in the second step was dropped over 1 minute. Immediately upon mixing of the polycondensation reaction liquid with water, a white mixed liquid was obtained. The mixed liquid was stirred at 25° C. for 24 hours to provide 2,184.5 g of a dispersion liquid containing spherical polymethylsilsesquioxane fine particles.

Fourth Step

To the spherical polymethylsilsesquioxane fine particle dispersion liquid obtained in the third step, 25.2 g of hexamethyldisilazane was added as a hydrophobizing agent, and the mixture was stirred at 25° C. for 48 hours. As a result, a powder floating liquid containing powder of hydrophobized spherical polymethylsilsesquioxane fine particles floating in the upper layer portion of the liquid was obtained. The powder floating liquid was left at rest for 5 minutes, and the powder which had floated up was collected by suction filtration and dried under reduced pressure at 100° C. for 24 hours to provide 26.6 g of white hydrophobized spherical polymethylsilsesquioxane fine particles.

Example 1-19

First Step

A 200 ml recovery flask was loaded with 52.0 g of water and 0.094 g of acetic acid serving as a catalyst, and the mixture was stirred at 30° C. To the mixture, 69.9 g of ethyltrimethoxysilane was added, and the whole was stirred for 90 minutes to provide 122.0 g of a raw material solution. In this case, the amount of methanol to be generated by the hydrolysis reaction of ethyltrimethoxysilane is 44.7 g.

Second Step

A 1,000 ml recovery flask was loaded with 24.7 g of 25% ammonia water, 130 g of water, and 330 g of methanol, and the mixture was stirred at 30° C. to prepare an alkaline aqueous medium. To the alkaline aqueous medium, 122 g of the raw material solution obtained in the first step was dropped over 1 minute.

The mixed liquid after the dropping of the raw material solution was directly stirred for 20 minutes to allow the polycondensation reaction of the fine particle precursor to proceed, to thereby provide 606.7 g of a polycondensation reaction liquid.

Third Step

A 5,000 ml recovery flask was loaded with 2,200 g of water serving as an aqueous solution, and to the stirred water at 25° C., 606.7 g of the polycondensation reaction liquid obtained in the second step was dropped over 1 minute. Immediately upon mixing of the polycondensation reaction liquid with water, a white mixed liquid was obtained. The mixed liquid was stirred at 25° C. for 24 hours to provide 2,806.7 g of a dispersion liquid containing spherical polyethylsilsesquioxane fine particles.

Fourth Step

To the spherical polyethylsilsesquioxane fine particle dispersion liquid obtained in the third step, 34.0 g of hexamethyldisilazane was added as a hydrophobizing agent, and the mixture was stirred at 25° C. for 48 hours. As a result, a powder floating liquid containing powder of hydrophobized spherical polyethylsilsesquioxane fine particles floating in the upper layer portion of the liquid was obtained. The powder floating liquid was left at rest for 5 minutes, and the powder which had floated up was collected by suction filtration and dried under reduced pressure at 100° C. for 24 hours to provide 35.8 g of white hydrophobized spherical polyethylsilsesquioxane fine particles.

Example 1-20

The first step to the fourth step were performed in the same manner as in Example 1-4 except that the amounts of water and methanol to be used in the second step were changed to 245 g and 190 g, respectively, and the mixed liquid after the dropping of the raw material solution was stirred for 5 minutes to allow the polycondensation reaction to proceed, and in the third step, 559.8 g of the polycondensation reaction liquid obtained in the second step was dropped to 2,100 g of water. Thus, dry powder of hydrophobized spherical polymethylsilsesquioxane fine particles was obtained.

The fine particle amount (solid content concentration) in the dispersion liquid containing spherical polymethylsilsesquioxane fine particles obtained in the third step was 1.3 mass %.

Example 1-21

The first step to the fourth step were performed in the same manner as in Example 1-4 except that in the third step, 559.8 g of the polycondensation reaction liquid obtained in the second step was dropped to 400 g of water. The fine particle amount (solid content concentration) in the dispersion liquid containing spherical polymethylsilsesquioxane fine particles obtained in the third step was 3.5 mass %.

Comparative Example 1-1

The first step to the third step were performed in the same manner as in Example 1-1, and the resultant dispersion liquid was distilled under reduced pressure at 40° C. to evaporate 150 g of methanol. A precipitate separated from and generated in the liquid was collected by suction filtration, and the resultant cake was dried under reduced pressure at 100° C. for 24 hours to provide powder of spherical polymethylsilsesquioxane fine particles. The resultant powder was subjected to disintegration treatment with a mortar for 30 minutes, and various physical properties were measured. Even in powder after disintegration, particles were firmly aggregated, and a homogeneous 2-propanol dispersion liquid was not able to be prepared even by ultrasonic irradiation at an output of 40 W, which was twice as large as the general condition. Thus, the measurement of the median diameter and the particle size distribution by the centrifugal sedimentation method was not able to be performed. In addition, also in the preparation of a simulated toner, toner particle surfaces were not able to be covered with the spherical polymethylsilsesquioxane fine particles. The powder was observed with a FE-SEM in a field of view at 100,000×, and 100 of the primary particles constituting the powder were randomly sampled to determine the average particle diameter to be 0.11 µm.

Comparative Example 1-2

122.0 g of a raw material solution obtained in the same manner as in Example 1-1 was added to a mixed liquid formed of 14 g of 25% ammonia water and 498 g of water, and immediately upon the addition, the solution became cloudy. The solution was directly stirred at 30° C. for 16 hours and then left at rest for 5 minutes. As a result, a white precipitate was generated at the bottom of the flask. The precipitate was collected by suction filtration, and the resultant cake was dried under reduced pressure at 100° C. for 24 hours to provide powder of spherical polymethylsilsesquioxane fine particles. The resultant powder was subjected to disintegration treatment with a mortar for 30 minutes, and various physical properties were measured. Even in powder after disintegration, particles were firmly aggregated, and a homogeneous 2-propanol dispersion liquid was not able to be prepared even by ultrasonic irradiation at an output of 40 W, which was twice as large as the general condition. Thus, the measurement of the median diameter and the particle size distribution by the centrifugal sedimentation method was not able to be performed. In addition, also in the preparation of a simulated toner, toner particle surfaces were not able to be covered with the spherical polymethylsilsesquioxane fine particles. The powder was observed with a FE-SEM in a field of view at 100,000×, and 100 of the primary particles constituting the powder were randomly sampled to determine the average particle diameter to be 0.39 µm.

Comparative Example 1-3

Powder of spherical polymethylsilsesquioxane fine particles was obtained in the same manner as in Comparative Example 1-2 except that the amount of 25% ammonia water was changed to 2.8 g and the amount of water was changed to 511 g. As compared to the powder of Comparative Example 1-1 or Comparative Example 1-2, the disintegration strength was small but the median diameter was as large as 0.57 μm, and hence toner particle surfaces were not able to be covered with the spherical polymethylsilsesquioxane fine particles.

Comparative Example 1-4

To a reaction solution in which a reaction had been performed for 16 hours in the same manner as in Comparative Example 1-2, 30.3 g of hexamethyldisilazane was added, and the mixture was stirred for 48 hours. A precipitate generated in the reaction liquid was collected by suction filtration, and the resultant cake was dried under reduced pressure at 100° C. for 24 hours. The median diameter was as large as 0.39 μm, and the toner coverage was insufficient.

Comparative Example 1-5

A 5 L separable flask was loaded with 1,040 g of methanol and 150 g of 15 mass % ammonia water, and the mixture was stirred at 35° C. To the mixture, 1,940 g of tetramethoxysilane and 700 g of 5 mass % ammonia water were each dropped into the liquid. The dropping rate was adjusted so that the dropping was completed in 5 hours, and after the completion of the dropping, the mixture was aged for 0.5 hour. Next, 230 g of hexamethyldisilazane was added, and the mixture was stirred at 35° C. for 1 hour to perform hydrophobizing treatment. The solvent was evaporated from the resultant hydrophobic silica dispersion liquid at 75° C., and the resultant cake was dried by being left at rest at 100° C. for 24 hours to provide powder of hydrophobic sol-gel method silica particles, and various physical properties were measured. The median diameter was 0.10 μm, the particle size distribution index was 1.6, and the disintegration strength was low. However, the floating ratio in 50 vol % methanol water was as small as 3 mass %, the saturated water content under 25° C. and 50% RH was increased to 7.4 mass %, and the charging stability index and environmental stability index of the simulated toner were poor.

Comparative Example 1-6

The first step and the second step were performed in the same manner as in Example 1-4 to provide 559.8 g of a polycondensation reaction liquid. To the polycondensation reaction liquid, 30.3 g of hexamethyldisilazane was added as a hydrophobizing agent, and the mixture was stirred at 25° C. An aggregate was generated in the liquid, and the aggregate was collected and vacuum-dried at 100° C. for 24 hours. However, independent spherical polymethylsilsesquioxane fine particles were not able to be obtained.

Comparative Example 1-7

In Example 1-4, the first step was not performed, and the second step to the fourth step were performed in the same manner as in Example 1-4 except that, in the second step, 68.0 g of methyltrimethoxysilane was dropped in place of 122.0 g of the raw material solution. The resultant precipitate was collected and vacuum-dried at 100° C. for 24 hours, but the resultant had a median diameter as large as 0.6 μm and an insufficient toner coverage.

Example 2-1

The first step and the second step were performed in the same manner as in Example 1-4 to provide 559.8 g of a polycondensation reaction liquid.

The third step was performed using the reaction apparatus 10 illustrated in FIG. 1. The Y-shaped trifurcate tubular reactor 20 used in Example 2-1 has an angle formed between the central axis of the first flow passage 110 and the central axis of the second flow passage 120 (hereinafter sometimes referred to as "branching angle") of 90 degrees, and has a ratio R/d1 (and R/d2) between the distance R from the flow outlet side of the constricted portion 112 (and the constricted portion 114) to the central point C and the constricted portion diameter d1 (and d2) of 12.5. In this example, the polycondensation reaction liquid and water serving as an aqueous solution were simultaneously supplied in such a manner that the polycondensation reaction liquid was supplied from the inlet side of the first flow passage 110 at a flow rate in the vicinity of the connecting portion 140 of 3.5 m/sec and the water was supplied from the inlet side of the second flow passage 120 at a flow rate in the vicinity of the connecting portion 140 of 3.5 m/sec (flow rate of water/flow rate of polycondensation reaction liquid=1, hereinafter referred to as "flow rate ratio"), to thereby perform collisional mixing in the connecting portion 140. Then, a mixed liquid discharged from the third flow passage 130, that is, 1,119.6 g of a dispersion liquid containing spherical polymethylsilsesquioxane fine particles was obtained. The dispersion liquid contained 2.6 mass % of the fine particles.

In the subsequent fourth step, 14.9 g of hexamethyldisilazane was added as a hydrophobizing agent to the dispersion liquid to perform a reaction at 70° C. for 3 hours. Powder was suction-filtered from the powder floating liquid thus obtained, and then vacuum-dried. Thus, 33.0 g of dry powder of hydrophobized spherical polymethylsilsesquioxane fine particles was obtained.

Example 2-2

The first step to the fourth step were performed in the same manner as in Example 2-1 except that, in the third step, the flow rate of the polycondensation reaction liquid was changed to 1.8 m/sec and the flow rate of water was changed to 1.8 m/sec. Thus, dry powder of hydrophobized spherical polymethylsilsesquioxane fine particles was obtained.

Example 2-3

The first step to the fourth step were performed in the same manner as in Example 2-1 except that, in the third step, the flow rate of the polycondensation reaction liquid was changed to 2.6 m/sec and the flow rate of water was changed to 2.6 m/sec. Thus, dry powder of hydrophobized spherical polymethylsilsesquioxane fine particles was obtained.

Example 2-4

The first step to the fourth step were performed in the same manner as in Example 2-1 except that, in the third step, the flow rate of the polycondensation reaction liquid was changed to 7.1 m/sec and the flow rate of water was changed to 7.1 m/sec. Thus, dry powder of hydrophobized spherical polymethylsilsesquioxane fine particles was obtained.

Example 2-5

The first step to the fourth step were performed in the same manner as in Example 2-1 except that, in the third step, the flow rate of the polycondensation reaction liquid was changed to 14.5 m/sec and the flow rate of water was changed to 14.5 m/sec. Thus, dry powder of hydrophobized spherical polymethylsilsesquioxane fine particles was obtained.

Example 2-6

The first step to the fourth step were performed in the same manner as in Example 2-1 except that, in the third step, the flow rate of the polycondensation reaction liquid was changed to 19 m/sec and the flow rate of water was changed to 19 m/sec. Thus, dry powder of hydrophobized spherical polymethylsilsesquioxane fine particles was obtained.

Example 2-7

The first step to the fourth step were performed in the same manner as in Example 2-1 except that, in the third step, the flow rate of the polycondensation reaction liquid was changed to 3.5 m/sec and the flow rate of water was changed to 1.4 m/sec (flow rate ratio: 0.4). Thus, dry powder of hydrophobized spherical polymethylsilsesquioxane fine particles was obtained.

In the third step, 783.7 g of a spherical polymethylsilsesquioxane fine particle dispersion liquid was obtained. The fine particle amount (solid content concentration) in the dispersion liquid containing spherical polymethylsilsesquioxane fine particles obtained in the third step was 3.8 mass %.

Example 2-8

The first step to the fourth step were performed in the same manner as in Example 2-1 except that, in the third step, the flow rate of the polycondensation reaction liquid was changed to 3.5 m/sec and the flow rate of water was changed to 7.1 m/sec (flow rate ratio: 2). Thus, dry powder of hydrophobized spherical polymethylsilsesquioxane fine particles was obtained.

In the third step, 1,679.4 g of a spherical polymethylsilsesquioxane fine particle dispersion liquid was obtained. The fine particle amount (solid content concentration) in the dispersion liquid containing spherical polymethylsilsesquioxane fine particles obtained in the third step was 1.7 mass %.

Example 2-9

The first step to the fourth step were performed in the same manner as in Example 2-1 except that, in the third step, the flow rate of the polycondensation reaction liquid was changed to 3.5 m/sec and the flow rate of water was changed to 13 m/sec (flow rate ratio: 3.8). Thus, dry powder of hydrophobized spherical polymethylsilsesquioxane fine particles was obtained.

In the third step, 2,687.0 g of a spherical polymethylsilsesquioxane fine particle dispersion liquid was obtained. The fine particle amount (solid content concentration) in the dispersion liquid containing spherical polymethylsilsesquioxane fine particles obtained in the third step was 1.1 mass %.

Example 2-10

The first step to the fourth step were performed in the same manner as in Example 2-1 except that, in the third step, a Y-shaped trifurcate tubular reactor 20 having a branching angle formed between the central axis of the first flow passage 110 and the central axis of the second flow passage 120 of 60 degrees was used. Thus, dry powder of hydrophobized spherical polymethylsilsesquioxane fine particles was obtained.

Example 2-11

The first step to the fourth step were performed in the same manner as in Example 2-1 except that, in the third step, a Y-shaped trifurcate tubular reactor 20 having a branching angle formed between the central axis of the first flow passage 110 and the central axis of the second flow passage 120 of 120 degrees was used. Thus, dry powder of hydrophobized spherical polymethylsilsesquioxane fine particles was obtained.

Example 2-12

The first step and the second step were performed in the same manner as in Example 1-16, and then the third step and the fourth step were performed in the same manner as in Example 2-1. Thus, dry powder of hydrophobized spherical polymethylsilsesquioxane fine particles was obtained.

Example 2-13

The first step and the second step were performed in the same manner as in Example 1-17, and then the third step and the fourth step were performed in the same manner as in Example 2-1. Thus, dry powder of hydrophobized spherical polymethylsilsesquioxane fine particles was obtained.

Example 2-14

The first step to the fourth step were performed in the same manner as in Example 2-1 except that, in the third step, a trifurcate tubular reactor 20 having an R/d1 (and R/d2) of 4 was used. Thus, dry powder of hydrophobized spherical polymethylsilsesquioxane fine particles was obtained.

Example 2-15

The first step to the fourth step were performed in the same manner as in Example 2-1 except that, in the third step, a trifurcate tubular reactor 20 having an R/d1 (and R/d2) of 20 was used. Thus, dry powder of hydrophobized spherical polymethylsilsesquioxane fine particles was obtained.

Example 2-16

The first step to the fourth step were performed in the same manner as in Example 2-1 except that, in the fourth step, the reaction temperature and the reaction time were changed to 25° C. and 48 hours, respectively. Thus, dry powder of hydrophobized spherical polymethylsilsesquioxane fine particles was obtained.

Example 2-17

The first step to the fourth step were performed in the same manner as in Example 2-16 except that, in the fourth step, the addition amount of hexamethyldisilazane serving as the hydrophobizing agent was changed to 29.8 g. Thus, dry powder of hydrophobized spherical polymethylsilsesquioxane fine particles was obtained.

Example 2-18

The first step to the fourth step were performed in the same manner as in Example 2-1 except that, in the fourth step, the addition amount of hexamethyldisilazane serving as the hydrophobizing agent was changed to 2.7 g and the hydrophobizing treatment time was changed to 4.5 hours. Thus, dry powder of hydrophobized spherical polymethylsilsesquioxane fine particles was obtained.

Example 2-19

The first step to the fourth step were performed in the same manner as in Example 2-1 except that, in the fourth step, the addition amount of hexamethyldisilazane serving as the hydrophobizing agent was changed to 7.5 g and the hydrophobizing treatment time was changed to 4.5 hours. Thus, dry powder of hydrophobized spherical polymethylsilsesquioxane fine particles was obtained.

Example 2-20

The first step to the fourth step were performed in the same manner as in Example 2-1 except that, in the fourth step, the hydrophobizing treatment time was changed to 1 hour. Thus, dry powder of hydrophobized spherical polymethylsilsesquioxane fine particles was obtained.

Example 2-21

The first step to the fourth step were performed in the same manner as in Example 2-1 except that, in the fourth step, the hydrophobizing treatment time was changed to 2 hours. Thus, dry powder of hydrophobized spherical polymethylsilsesquioxane fine particles was obtained.

Example 2-22

The first step to the fourth step were performed in the same manner as in Example 2-1 except that, in the fourth step, the hydrophobizing treatment time was changed to 5 hours. Thus, dry powder of hydrophobized spherical polymethylsilsesquioxane fine particles was obtained.

Example 2-23

The first step to the fourth step were performed in the same manner as in Example 2-1 except that, in the fourth step, the addition amount of hexamethyldisilazane serving as the hydrophobizing agent was changed to 30.3 g. Thus, dry powder of hydrophobized spherical polymethylsilsesquioxane fine particles was obtained.

Example 2-24

The first step to the third step were performed in the same manner as in Example 2-12 to provide 641.6 g of a spherical polymethylsilsesquioxane fine particle dispersion liquid. The fine particle amount (solid content concentration) in the dispersion liquid containing spherical polymethylsilsesquioxane fine particles obtained in the third step was 5.3 mass %.

Next, the fourth step was performed in the same manner as in Example 2-12 except that the addition amount of hexamethyldisilazane serving as the hydrophobizing agent was changed to 7.6 g and the hydrophobizing treatment time was changed to 4.5 hours. Thus, dry powder of hydrophobized spherical polymethylsilsesquioxane fine particles was obtained.

Example 2-25

The first step to the fourth step were performed in the same manner as in Example 2-24 except that, in the third step, the flow rate of the polycondensation reaction liquid was changed to 3.5 m/sec and the flow rate of water was changed to 1.4 m/sec (flow rate ratio: 0.4). Thus, dry powder of hydrophobized spherical polymethylsilsesquioxane fine particles was obtained.

In the third step, 449.1 g of a spherical polymethylsilsesquioxane fine particle dispersion liquid was obtained. The fine particle amount (solid content concentration) in the dispersion liquid containing spherical polymethylsilsesquioxane fine particles obtained in the third step was 7.5 mass %.

Example 2-26

The first step to the fourth step were performed in the same manner as in Example 2-24 except that, in the third step, the flow rate of the polycondensation reaction liquid was changed to 3.5 m/sec and the flow rate of water was changed to 2.5 m/sec (flow rate ratio: 0.7). Thus, dry powder of hydrophobized spherical polymethylsilsesquioxane fine particles was obtained.

The fine particle amount (solid content concentration) in the dispersion liquid containing spherical polymethylsilsesquioxane fine particles obtained in the third step was 6.1 mass %.

Example 2-27

The first step to the fourth step were performed in the same manner as in Example 2-1 except that, in the third step, the flow rate of the polycondensation reaction liquid was changed to 1.4 m/sec and the flow rate of water was changed to 1.4 m/sec. Thus, dry powder of hydrophobized spherical polymethylsilsesquioxane fine particles was obtained.

Example 2-28

The first step to the fourth step were performed in the same manner as in Example 2-1 except that, in the third step, the flow rate of the polycondensation reaction liquid was changed to 25 m/sec and the flow rate of water was changed to 25 m/sec. Thus, dry powder of hydrophobized spherical polymethylsilsesquioxane fine particles was obtained.

Example 2-29

The first step to the fourth step were performed in the same manner as in Example 2-1 except that, in the third step, the flow rate of the polycondensation reaction liquid was changed to 3.5 m/sec and the flow rate of water was changed to 17.5 m/sec (flow rate ratio: 5). Thus, dry powder of hydrophobized spherical polymethylsilsesquioxane fine particles was obtained.

In the third step, 3,358.8 g of a spherical polymethylsilsesquioxane fine particle dispersion liquid was obtained. The fine particle amount (solid content concentration) in the dispersion liquid containing spherical polymethylsilsesquioxane fine particles obtained in the third step was 0.9 mass %.

Example 2-30

The first step to the fourth step were performed in the same manner as in Example 2-29 except that, in the fourth step, the addition amount of hexamethyldisilazane serving as the hydrophobizing agent was changed to 2.7 g and the hydrophobizing treatment time was changed to 4.5 hours. Thus, dry powder of hydrophobized spherical polymethylsilsesquioxane fine particles was obtained.

Example 2-31

The first step to the fourth step were performed in the same manner as in Example 2-1 except that, in the third step, a Y-shaped tubular reactor having an R/d1 (and R/d2) of 30 was used. Thus, dry powder of hydrophobized spherical polymethylsilsesquioxane fine particles was obtained.

Example 2-32

The first step and the second step were performed in the same manner as in Example 1-20, and then the third step and the fourth step were performed in the same manner as in Example 2-1. Thus, dry powder of hydrophobized spherical polymethylsilsesquioxane fine particles was obtained.

Comparative Example 2-1

The same procedure as that in Example 2-1 was performed except that the second step was not performed. However, spherical polymethylsilsesquioxane fine particles were not obtained, and various physical properties were not able to be measured.

Comparative Example 2-2

The first step to the third step were performed in the same manner as in Example 2-1, and the resultant dispersion liquid was distilled under reduced pressure at 40° C. to evaporate 150 g of methanol. A precipitate separated from and generated in the liquid was collected by suction filtration, and the resultant cake was dried under reduced pressure at 100° C. for 24 hours to provide powder of spherical polymethylsilsesquioxane fine particles. The resultant powder was subjected to disintegration treatment with a mortar for 30 minutes, and various physical properties were measured. Even in powder after disintegration, the particles were firmly aggregated, and a homogeneous 2-propanol dispersion liquid was not able to be prepared even by ultrasonic irradiation at an output of 40 W, which was twice as large as the general condition. Thus, the measurement of the median diameter and the particle size distribution by the centrifugal sedimentation method was not able to be performed. In addition, also in the preparation of a simulated toner, toner particle surfaces were not able to be covered with the spherical polymethylsilsesquioxane fine particles. The powder was observed with a FE-SEM in a field of view at 100,000×, and 100 of the primary particles constituting the powder were randomly sampled to determine the average particle diameter to be 0.08 μm.

(Evaluation Results Etc.)

Various evaluation results of the fine particles obtained in each of Examples and Comparative Examples described above, and the solid content concentration and other manufacturing conditions in the manufacture of the fine particles are shown in Table 1 to Table 7.

TABLE 1

| | Organic solvent content ratio in alkaline aqueous medium mass % | Organic solvent content ratio A mass % | Solid content concentration mass % | Median diameter μm | Particle size distribution index — | Average circularity — | Saturated water content mass % | Degree of hydrophobicity vol % | Floating ratio mass % | Disintegration strength N | Toner coverage % |
|---|---|---|---|---|---|---|---|---|---|---|---|
| Example 1-1 | 74.5 | 67.8 | 1.1 | 0.12 | 2.1 | 0.94 | 2.2 | 57 | 84 | 0.010 | 5.5 |
| Example 1-2 | 74.5 | 75.4 | 1.4 | 0.22 | 3.9 | 0.95 | 2.2 | 56 | 82 | 0.010 | 5.0 |
| Example 1-3 | 74.5 | 64.0 | 0.7 | 0.09 | 2.3 | 0.92 | 2.2 | 59 | 87 | 0.015 | 5.9 |
| Example 1-4 | 76.5 | 68.4 | 1.3 | 0.12 | 2.1 | 0.95 | 2.0 | 60 | 87 | 0.014 | 6.0 |
| Example 1-5 | 76.5 | 68.4 | 1.5 | 0.12 | 2.3 | 0.93 | 2.1 | 56 | 83 | 0.027 | 5.3 |
| Example 1-6 | 76.5 | 68.4 | 2.0 | 0.14 | 2.6 | 0.94 | 2.2 | 55 | 83 | 0.036 | 4.8 |
| Example 1-7 | 76.5 | 68.4 | 1.3 | 0.12 | 2.1 | 0.94 | 2.1 | 58 | 85 | 0.018 | 5.6 |
| Example 1-8 | 76.5 | 68.4 | 1.3 | 0.12 | 2.1 | 0.95 | 2.1 | 58 | 85 | 0.019 | 5.6 |
| Example 1-9 | 77.0 | 68.7 | 1.3 | 0.14 | 2.2 | 0.96 | 2.0 | 60 | 87 | 0.014 | 6.0 |
| Example 1-10 | 54.2 | 51.0 | 1.3 | 0.12 | 2.2 | 0.93 | 2.0 | 59 | 86 | 0.019 | 5.1 |
| Example 1-11 | 88.1 | 77.6 | 1.3 | 0.12 | 2.4 | 0.93 | 2.2 | 56 | 82 | 0.028 | 5.1 |

TABLE 1-continued

| | Organic solvent content ratio in alkaline aqueous medium mass % | Organic solvent content ratio A mass % | Solid content concentration mass % | Median diameter μm | Particle size distribution index — | Average circularity — | Saturated water content mass % | Degree of hydrophobicity vol % | Floating ratio mass % | Disintegration strength N | Toner coverage % |
|---|---|---|---|---|---|---|---|---|---|---|---|
| Example 1-12 | 76.5 | 68.4 | 1.3 | 0.12 | 2.1 | 0.95 | 2.2 | 52 | 71 | 0.112 | 3.3 |
| Example 1-13 | 76.5 | 68.4 | 1.3 | 0.12 | 2.1 | 0.95 | 2.2 | 55 | 81 | 0.095 | 4.1 |
| Example 1-14 | 76.5 | 68.4 | 1.3 | 0.12 | 2.1 | 0.95 | 2.2 | 55 | 82 | 0.038 | 4.6 |
| Example 1-15 | 76.5 | 68.4 | 1.3 | 0.12 | 2.1 | 0.95 | 2.0 | 60 | 88 | 0.009 | 6.1 |
| Example 1-16 | 84.5 | 67.4 | 2.1 | 0.19 | 2.4 | 0.94 | 2.1 | 59 | 86 | 0.014 | 5.7 |
| Example 1-17 | 80.7 | 58.5 | 3.0 | 0.28 | 2.9 | 0.94 | 2.1 | 58 | 86 | 0.014 | 5.3 |
| Example 1-18 | 71.7 | 65.6 | 1.3 | 0.10 | 2.7 | 0.94 | 2.2 | 55 | 81 | 0.035 | 4.1 |
| Example 1-19 | 68.1 | 72.3 | 1.3 | 0.11 | 2.7 | 0.93 | 1.5 | 55 | 81 | 0.055 | 4.1 |
| Example 1-20 | 43.4 | 42.5 | 1.3 | 0.15 | 5.2 | 0.85 | 2.2 | 55 | 81 | 0.078 | 2.8 |
| Example 1-21 | 76.5 | 68.4 | 3.5 | 0.28 | 4.5 | 0.88 | 2.2 | 56 | 82 | 0.060 | 3.0 |

TABLE 2

| | Organic solvent content ratio in alkaline aqueous medium mass % | Organic solvent content ratio A mass % | Solid content concentration mass % | Median diameter μm | Particle size distribution index — |
|---|---|---|---|---|---|
| Comparative Example 1-1 | 74.5 | 67.8 | 1.1 | Unmeasurable | Unmeasurable |
| Comparative Example 1-2 | 0 | 7.6 | Third step was not performed | Unmeasurable | Unmeasurable |
| Comparative Example 1-3 | 0 | 7.6 | Third step was not performed | 0.57 | 1.8 |
| Comparative Example 1-4 | 0 | 7.6 | Third step was not performed | 0.39 | 2.0 |
| Comparative Example 1-5 | First and second steps were not performed | First and second steps were not performed | Third step was not performed | 0.10 | 1.6 |
| Comparative Example 1-6 | 76.5 | 68.4 | (Independent spherical particles were not obtained) | | |
| Comparative Example 1-7 | 76.5 | 66.2 | 1.3 | 0.65 | 4.6 |

| | Average circularity — | Saturated water content mass % | Degree of hydrophobicity vol % | Floating ratio mass % | Disintegration strength N | Toner coverage % |
|---|---|---|---|---|---|---|
| Comparative Example 1-1 | 0.94 | 2.4 | 42 | 0 | 0.280 | Less than 1 |
| Comparative Example 1-2 | 0.92 | 2.5 | 43 | 5 | 0.180 | Less than 1 |
| Comparative Example 1-3 | 0.93 | 2.5 | 44 | 8 | 0.050 | Less than 1 |
| Comparative Example 1-4 | 0.92 | 2.2 | 57 | 82 | 0.010 | 1.8 |
| Comparative Example 1-5 | 0.85 | 7.4 | 56 | 3 | 0.010 | 4.9 |
| Comparative Example 1-6 | (Independent spherical particles were not obtained) | | | | | |

TABLE 2-continued

| | | | | | | |
|---|---|---|---|---|---|---|
| Comparative Example 1-7 | 0.82 | 2.2 | 56 | 81 | 0.057 | Less than 1 |

TABLE 3

| | Branching angle Degrees | R/d1, R/d2 — | Flow rate of polycondensation reaction liquid m/sec | Flow rate ratio — | Organic solvent content ratio in alkaline aqueous medium mass % | Organic solvent content ratio A mass % | Solid content concentration mass % |
|---|---|---|---|---|---|---|---|
| Example 2-1 | 90 | 12.5 | 3.5 | 1 | 76.5 | 68.4 | 2.6 |
| Example 2-2 | 90 | 12.5 | 1.8 | 1 | 76.5 | 68.4 | 2.6 |
| Example 2-3 | 90 | 12.5 | 2.6 | 1 | 76.5 | 68.4 | 2.6 |
| Example 2-4 | 90 | 12.5 | 7.1 | 1 | 76.5 | 68.4 | 2.6 |
| Example 2-5 | 90 | 12.5 | 14.5 | 1 | 76.5 | 68.4 | 2.6 |
| Example 2-6 | 90 | 12.5 | 19 | 1 | 76.5 | 68.4 | 2.6 |
| Example 2-7 | 90 | 12.5 | 3.5 | 0.4 | 76.5 | 68.4 | 3.8 |
| Example 2-8 | 90 | 12.5 | 3.5 | 2 | 76.5 | 68.4 | 1.7 |
| Example 2-9 | 90 | 12.5 | 3.5 | 3.8 | 76.5 | 68.4 | 1.1 |
| Example 2-10 | 60 | 12.5 | 3.5 | 1 | 76.5 | 68.4 | 2.6 |
| Example 2-11 | 120 | 12.5 | 3.5 | 1 | 76.5 | 68.4 | 2.6 |
| Example 2-12 | 90 | 12.5 | 3.5 | 1 | 84.5 | 67.4 | 5.3 |
| Example 2-13 | 90 | 12.5 | 3.5 | 1 | 80.7 | 58.5 | 7.4 |
| Example 2-14 | 90 | 4 | 3.5 | 1 | 76.5 | 68.4 | 2.6 |
| Example 2-15 | 90 | 20 | 3.5 | 1 | 76.5 | 68.4 | 2.6 |
| Example 2-16 | 90 | 12.5 | 3.5 | 1 | 76.5 | 68.4 | 2.6 |
| Example 2-17 | 90 | 12.5 | 3.5 | 1 | 76.5 | 68.4 | 2.6 |
| Example 2-18 | 90 | 12.5 | 3.5 | 1 | 76.5 | 68.4 | 2.6 |
| Example 2-19 | 90 | 12.5 | 3.5 | 1 | 76.5 | 68.4 | 2.6 |
| Example 2-20 | 90 | 12.5 | 3.5 | 1 | 76.5 | 68.4 | 2.6 |
| Example 2-21 | 90 | 12.5 | 3.5 | 1 | 76.5 | 68.4 | 2.6 |

TABLE 4

| | Branching angle Degrees | R/d1, R/d2 — | Flow rate of polycondensation reaction liquid m/sec | Flow rate ratio — | Organic solvent content ratio in alkaline aqueous medium mass % | Organic solvent content ratio A mass % | Solid content concentration mass % |
|---|---|---|---|---|---|---|---|
| Example 2-22 | 90 | 12.5 | 3.5 | 1 | 76.5 | 68.4 | 2.6 |
| Example 2-23 | 90 | 12.5 | 3.5 | 1 | 76.5 | 68.4 | 2.6 |
| Example 2-24 | 90 | 12.5 | 3.5 | 1 | 84.5 | 67.4 | 5.3 |
| Example 2-25 | 90 | 12.5 | 3.5 | 0.4 | 84.5 | 67.4 | 7.5 |
| Example 2-26 | 90 | 12.5 | 3.5 | 0.7 | 84.5 | 67.4 | 6.1 |
| Example 2-27 | 90 | 12.5 | 1.4 | 1 | 76.5 | 68.4 | 2.6 |
| Example 2-28 | 90 | 12.5 | 25 | 1 | 76.5 | 68.4 | 2.6 |
| Example 2-29 | 90 | 12.5 | 3.5 | 5 | 76.5 | 68.4 | 0.9 |
| Example 2-30 | 90 | 12.5 | 3.5 | 5 | 76.5 | 68.4 | 0.9 |
| Example 2-31 | 90 | 30 | 3.5 | 1 | 76.5 | 68.4 | 2.6 |
| Example 2-32 | 90 | 30 | 3.5 | 1 | 43.4 | 42.5 | 2.6 |
| Comparative Example 2-1 | 90 | 12.5 | 3.5 | 1 | Second step was not performed | Second step was not performed | — |
| Comparative Example 2-2 | 90 | 12.5 | 3.5 | 1 | 76.5 | 68.4 | 2.6 |

TABLE 5

| | Median diameter μm | Particle size distribution index — | Average circularity — | Saturated water content mass % | Degree of hydrophobicity vol % | Floating ratio mass % | Disintegration strength N | Toner coverage % |
|---|---|---|---|---|---|---|---|---|
| Example 2-1 | 0.09 | 2.0 | 0.95 | 1.9 | 61 | 90 | 0.008 | 6.4 |
| Example 2-2 | 0.10 | 2.9 | 0.93 | 2.2 | 61 | 86 | 0.009 | 5.5 |
| Example 2-3 | 0.09 | 2.2 | 0.95 | 1.9 | 61 | 86 | 0.008 | 6.2 |
| Example 2-4 | 0.09 | 2.0 | 0.95 | 1.8 | 62 | 88 | 0.008 | 6.4 |
| Example 2-5 | 0.09 | 2.5 | 0.94 | 2.2 | 61 | 86 | 0.009 | 5.3 |
| Example 2-6 | 0.07 | 3.8 | 0.95 | 2.2 | 60 | 84 | 0.009 | 5.0 |
| Example 2-7 | 0.25 | 2.3 | 0.94 | 1.9 | 63 | 89 | 0.009 | 5.8 |
| Example 2-8 | 0.09 | 2.1 | 0.95 | 2.0 | 61 | 88 | 0.008 | 6.2 |
| Example 2-9 | 0.10 | 3.2 | 0.90 | 2.2 | 57 | 86 | 0.010 | 5.2 |
| Example 2-10 | 0.09 | 2.1 | 0.93 | 2.0 | 60 | 86 | 0.008 | 6.0 |
| Example 2-11 | 0.09 | 2.2 | 0.94 | 2.0 | 60 | 88 | 0.008 | 6.4 |
| Example 2-12 | 0.09 | 2.2 | 0.93 | 2.0 | 65 | 89 | 0.008 | 6.2 |
| Example 2-13 | 0.29 | 3.9 | 0.92 | 2.1 | 65 | 89 | 0.009 | 4.4 |
| Example 2-14 | 0.09 | 2.0 | 0.94 | 1.9 | 61 | 84 | 0.008 | 6.4 |
| Example 2-15 | 0.09 | 2.2 | 0.94 | 2.2 | 61 | 86 | 0.008 | 6.0 |
| Example 2-16 | 0.09 | 2.0 | 0.95 | 2.2 | 56 | 84 | 0.012 | 5.4 |
| Example 2-17 | 0.09 | 2.0 | 0.95 | 2.1 | 61 | 88 | 0.021 | 5.2 |
| Example 2-18 | 0.09 | 2.0 | 0.95 | 2.3 | 53 | 70 | 0.044 | 4.4 |
| Example 2-19 | 0.09 | 2.0 | 0.95 | 1.9 | 61 | 86 | 0.005 | 6.6 |
| Example 2-20 | 0.09 | 2.0 | 0.95 | 2.2 | 55 | 82 | 0.060 | 4.8 |
| Example 2-21 | 0.09 | 2.0 | 0.95 | 2.2 | 57 | 84 | 0.030 | 5.4 |

TABLE 6

| | Median diameter μm | Particle size distribution index — | Average circularity — | Saturated water content mass % | Degree of hydrophobicity vol % | Floating ratio mass % | Disintegration strength N | Toner coverage % |
|---|---|---|---|---|---|---|---|---|
| Example 2-22 | 0.09 | 2.0 | 0.95 | 1.8 | 65 | 90 | 0.005 | 6.4 |
| Example 2-23 | 0.09 | 2.0 | 0.94 | 2.0 | 63 | 86 | 0.009 | 6.0 |
| Example 2-24 | 0.09 | 2.2 | 0.93 | 1.8 | 64 | 89 | 0.005 | 6.5 |
| Example 2-25 | 0.18 | 2.0 | 0.95 | 1.8 | 68 | 88 | 0.005 | 6.0 |
| Example 2-26 | 0.13 | 2.1 | 0.94 | 1.8 | 67 | 88 | 0.005 | 6.2 |
| Example 2-27 | 0.11 | 4.2 | 0.94 | 2.2 | 60 | 86 | 0.010 | 3.9 |
| Example 2-28 | 0.05 | 4.5 | 0.92 | 2.2 | 61 | 88 | 0.025 | 3.2 |
| Example 2-29 | 0.10 | 5.2 | 0.89 | 2.2 | 55 | 82 | 0.020 | 3.5 |
| Example 2-30 | 0.10 | 5.2 | 0.89 | 2.3 | 48 | 0 | 0.082 | 2.8 |
| Example 2-31 | 0.11 | 4.5 | 0.92 | 2.2 | 60 | 86 | 0.012 | 3.6 |

TABLE 6-continued

| | Median diameter μm | Particle size distribution index — | Average circularity — | Saturated water content mass % | Degree of hydrophobicity vol % | Floating ratio mass % | Disintegration strength N | Toner coverage % |
|---|---|---|---|---|---|---|---|---|
| Example 2-32 | 0.13 | 4.9 | 0.88 | 2.2 | 59 | 83 | 0.036 | 3.0 |
| Comparative Example 2-1 | (Independent spherical particles were not obtained) | | | | | | | |
| Comparative Example 2-2 | Unmeasurable | Unmeasurable | 0.95 | 2.4 | 38 | 0 | 0.292 | Less than 1 |

TABLE 7

| | Charging stability index % | Environmental stability index — |
|---|---|---|
| Example 1-1 | 99.7 | 0.59 |
| Example 1-2 | 99.1 | 0.59 |
| Example 1-3 | 99.5 | 0.60 |
| Example 1-4 | 99.5 | 0.59 |
| Example 1-12 | 96.4 | 0.64 |
| Example 1-13 | 98.5 | 0.62 |
| Example 1-14 | 99.5 | 0.59 |
| Example 2-1 | 99.5 | 0.58 |
| Example 2-19 | 98.8 | 0.60 |
| Example 2-24 | 99.5 | 0.58 |
| Comparative Example 1-1 | — | — |
| Comparative Example 1-2 | — | — |
| Comparative Example 1-3 | — | — |
| Comparative Example 1-4 | — | — |
| Comparative Example 1-5 | 41.2 | 0.71 |
| Comparative Example 1-7 | — | — |

TABLE 8

| Treatment temperature: | | Reaction time (hr) | | | |
|---|---|---|---|---|---|
| 70° C. | | 1 | 1.5 | 3 | 4.5 |
| HMDS amount (parts by mass) | 100 | 57 vol % | 62 vol % | — | — |
| | | 0.016 N | 0.021 N | — | — |
| | 50 | — | 58 vol % | 63 vol % | — |
| | | — | 0.012 N | 0.008 N | — |
| | 25 | — | 55 vol % | 60 vol % | 63 vol % |
| | | — | 0.014 N | 0.007 N | 0.005 N |
| | 10 | — | — | 47 vol % | 53 vol % |
| | | — | — | 0.080 N | 0.051 N |

Example 3

To the dispersion liquid (solid content concentration: 5.3 mass %) containing spherical polymethylsilsesquioxane fine particles obtained in the third step of Example 2-12, hexamethyldisilazane was added as a hydrophobizing agent, and the mixture was stirred at 70° C. for a predetermined period of time. Next, the upper layer portion (powder floating liquid) of the liquid was collected and dried under reduced pressure in the same manner as in Example 1-1 to provide dry powder of hydrophobized spherical polymethylsilsesquioxane fine particles. The resultant dry powder was evaluated for its degree of hydrophobicity and disintegration strength. The results are shown in Table 8. In Table 8, a value in the upper row represents the degree of hydrophobicity, and a value in the lower row represents the disintegration strength. In addition, hydrophobizing treatment was performed with a combination of a value shown in the treatment time (stirring time) column shown in Table 8, and a value shown in the HMDS addition amount column. Incidentally, the "HMDS addition amount" in Table 8 means the addition amount (parts by mass) of hexamethyldisilazane per 100 parts by mass of the solid content in the dispersion liquid.

Comparing the result for a reaction time of 1.5 hr and a HMDS addition amount of 100 parts by mass in Table 8, and the result for a reaction time of 4.5 hours and a HMDS addition amount of 25 parts by mass in Table 8, it was found that, even when the HMDS addition amount was reduced to ¼, a high degree of hydrophobicity was maintained and the disintegration strength was significantly reduced (powder becomes easier to loosen).

Example 4

To the dispersion liquid (solid content concentration: 5.3 mass %) containing spherical polymethylsilsesquioxane fine particles obtained in the third step of Example 2-12, hexamethyldisilazane was added as a hydrophobizing agent, and the mixture was stirred at 25° C. for a predetermined period of time. Next, the upper layer portion (powder floating liquid) of the liquid was collected and dried under reduced pressure in the same manner as in Example 1-1 to provide dry powder of hydrophobized spherical polymethylsilsesquioxane fine particles. The resultant dry powder was evaluated for its degree of hydrophobicity and disintegration strength. The results are shown in Table 9. In Table 9, a value in the upper row represents the degree of hydrophobicity, and a value in the lower row represents the disintegration strength. In addition, hydrophobizing treatment was performed with a combination of a value shown in the treatment time (stirring time) column shown in Table 9, and a value shown in the HMDS addition amount column. Incidentally, the "HMDS addition amount" in Table 9 means the addition amount (parts by mass) of hexamethyldisilazane per 100 parts by mass of the solid content in the dispersion liquid.

Comparing the result for a reaction time of 1.5 hr and a HMDS addition amount of 100 parts by mass in Table 8, and the result for a reaction time of 72 hours and a HMDS addition amount of 100 parts by mass in Table 9, it was found that powder having a comparable degree of hydrophobicity and having a lower disintegration strength (powder becomes easier to loosen) was obtained by increasing the treatment temperature from 25° C. to 70° C.

TABLE 9

| Treatment temperature: 25° C. | Reaction time (hr) | |
|---|---|---|
| | 48 | 72 |
| HMDS amount (parts by mass) | 100 | 59 vol % 0.033 N | 62 vol % 0.049 N |

REFERENCE SIGNS LIST 10 reaction apparatus
20 Y-shaped trifurcate tubular reactor
30 first pump
32 second pump
40 first raw material tank
42 second raw material tank
50 collection tank
110 first flow passage
112, 114 constricted portion
120 second flow passage
130 third flow passage
140 connecting portion

The invention claimed is:

1. A hydrophobized spherical polyalkylsilsesquioxane fine particle, which has a mass-based median diameter in a centrifugal sedimentation method within a range of from 0.05 µm to 0.3 µm,
wherein the hydrophobized spherical polyalkylsilsesquioxane fine particle has a disintegration strength in a crushing strength measurement method of 0.20 N or less.

2. The hydrophobized spherical polyalkylsilsesquioxane fine particle according to claim 1, wherein the hydrophobized spherical polyalkylsilsesquioxane fine particle comprises a hydrophobized spherical polymethylsilsesquioxane fine particle.

3. An external additive for toner, comprising hydrophobized spherical polyalkylsilsesquioxane fine particles having a mass-based median diameter in a centrifugal sedimentation method within a range of from 0.05 µm to 0.3 µm,
wherein the hydrophobized spherical polyalkylsilsesquioxane fine particles have a disintegration strength in a crushing strength measurement method of 0.20 N or less.

4. A dry toner for electrophotography, comprising:
toner particles; and
hydrophobized spherical polyalkylsilsesquioxane fine particles having a mass-based median diameter in a centrifugal sedimentation method within a range of from 0.05 µm to 0.3 µm.

5. A method of manufacturing a hydrophobized spherical polyalkylsilsesquioxane fine particle, the hydrophobized spherical polyalkylsilsesquioxane fine particle having a mass-based median diameter in a centrifugal sedimentation method within a range of from 0.05 µm to 0.3 µm,
the method comprising:
mixing a raw material solution containing a fine particle precursor selected from the group consisting of (i) a hydrolysate of an alkyltrialkoxysilane, (ii) a partial condensate of the hydrolysate, and (iii) a mixture of the hydrolysate and the partial condensate, and an organic solvent, with an alkaline aqueous medium containing an organic solvent to subject the fine particle precursor to a polycondensation reaction, to thereby obtain a polycondensation reaction liquid;
mixing the polycondensation reaction liquid with an aqueous solution, to thereby obtain a spherical polyalkylsilsesquioxane fine particle dispersion liquid having dispersed therein a spherical polyalkylsilsesquioxane fine particle; and
blending a hydrophobizing agent in the spherical polyalkylsilsesquioxane fine particle dispersion liquid to subject a surface of the spherical polyalkylsilsesquioxane fine particle to hydrophobizing treatment.

6. The method of manufacturing a hydrophobized spherical polyalkylsilsesquioxane fine particle according to claim 5, wherein the following expression (1) is satisfied:

$$100 \times (OS1 + OS2)/(L1 + L2) \geq 50 \text{ mass \%} \quad \text{Expression (1)}$$

in the expression (1):
OS1 represents a content (g) of the organic solvent contained in the raw material solution used in preparation of the polycondensation reaction liquid;
OS2 represents a content (g) of the organic solvent contained in the alkaline aqueous medium used in preparation of the polycondensation reaction liquid;
L1 represents an amount (g) of the raw material solution used in preparation of the polycondensation reaction liquid; and
L2 represents an amount (g) of the alkaline aqueous medium used in preparation of the polycondensation reaction liquid.

7. The method of manufacturing a hydrophobized spherical polyalkylsilsesquioxane fine particle according to claim 5, wherein the alkyltrialkoxysilane comprises methyltrimethoxysilane.

8. The method of manufacturing a hydrophobized spherical polyalkylsilsesquioxane fine particle according to claim 5, wherein the mixing of the polycondensation reaction liquid with the aqueous solution is performed so that a composition of a mixed liquid obtained by mixing the polycondensation reaction liquid with the aqueous solution is always kept constant with respect to a lapse of time.

9. The method of manufacturing a hydrophobized spherical polyalkylsilsesquioxane fine particle according to claim 5, wherein the mixing of the polycondensation reaction liquid with the aqueous solution is performed by continuously supplying the polycondensation reaction liquid in a constant flow amount from an inlet side of a first flow passage of three flow passages trifurcated from a connecting portion toward a connecting portion side, and continuously supplying the aqueous solution in a constant flow amount from an inlet side of a second flow passage of the three flow passages toward the connecting portion side.

10. The method of manufacturing a hydrophobized spherical polyalkylsilsesquioxane fine particle according to claim 5, wherein the mixing of the polycondensation reaction liquid with the aqueous solution is performed so that a composition of a mixed liquid obtained by mixing the polycondensation reaction liquid with the aqueous solution changes with a lapse of time.

11. The method of manufacturing a hydrophobized spherical polyalkylsilsesquioxane fine particle according to claim 5, wherein the mixing of the polycondensation reaction liquid with the aqueous solution is performed by dropping a droplet of the polycondensation reaction liquid to a liquid surface of the aqueous solution placed in a container.

12. A hydrophobized spherical polyalkylsilsesquioxane fine particle, which has a mass-based median diameter in a centrifugal sedimentation method within a range of from 0.05 µm to 0.3 µm, wherein the hydrophobized spherical polyalkylsilsesquioxane fine particle has a ratio of a mass-based 90% cumulative diameter (D90 diameter) to a mass-based 10% cumulative diameter (D10 diameter) (D90 diameter/D10 diameter) within a range of from 1.5 to 4.0 in a mass-based particle size distribution to be obtained by the centrifugal sedimentation method.

13. The hydrophobized spherical polyalkylsilsesquioxane fine particle according to claim 12, wherein the hydrophobized spherical polyalkylsilsesquioxane fine particle comprises a hydrophobized spherical polymethylsilsesquioxane fine particle.

14. A hydrophobized spherical polyalkylsilsesquioxane fine particle, which has a mass-based median diameter in a centrifugal sedimentation method within a range of from 0.05 μm to 0.3 μm, wherein the hydrophobized spherical polyalkylsilsesquioxane fine particle has a degree of hydrophobicity in a methanol titration method of 55 vol % or more, and has a floating ratio in methanol water having a methanol concentration of 50 vol % of 80 mass % or more.

15. The hydrophobized spherical polyalkylsilsesquioxane fine particle according to claim 14, wherein the hydrophobized spherical polyalkylsilsesquioxane fine particle comprises a hydrophobized spherical polymethylsilsesquioxane fine particle.

16. An external additive for toner, comprising hydrophobized spherical polyalkylsilsesquioxane fine particles having a mass-based median diameter in a centrifugal sedimentation method within a range of from 0.05 μm to 0.3 μm, wherein the hydrophobized spherical polyalkylsilsesquioxane fine particles have a ratio of a mass-based 90% cumulative diameter (D90 diameter) to a mass-based 10% cumulative diameter (D10 diameter) (D90 diameter/D10 diameter) within a range of from 1.5 to 4.0 in a mass-based particle size distribution to be obtained by the centrifugal sedimentation method.

17. An external additive for toner, comprising hydrophobized spherical polyalkylsilsesquioxane fine particles having a mass-based median diameter in a centrifugal sedimentation method within a range of from 0.05 μm to 0.3 μm, wherein the hydrophobized spherical polyalkylsilsesquioxane fine particles have a degree of hydrophobicity in a methanol titration method of 55 vol % or more, and have a floating ratio in methanol water having a methanol concentration of 50 vol % of 80 mass % or more.

* * * * *